United States Patent
Crawley

(10) Patent No.: US 12,122,083 B2
(45) Date of Patent: Oct. 22, 2024

(54) METHOD AND APPARATUS FOR INTEGRAL DOUBLE-WALLED CONTAINER STRUCTURES

(71) Applicant: Alan Mark Crawley, Blenheim (NZ)

(72) Inventor: Alan Mark Crawley, Blenheim (NZ)

( * ) Notice: Subject to any disclaimer, the term of this patent is extended or adjusted under 35 U.S.C. 154(b) by 0 days.

(21) Appl. No.: 17/819,443

(22) Filed: Aug. 12, 2022

(65) Prior Publication Data

US 2022/0379540 A1    Dec. 1, 2022

Related U.S. Application Data

(63) Continuation of application No. 16/965,144, filed as application No. PCT/IB2019/050684 on Jan. 28, 2019, now Pat. No. 11,446,855.

(30) Foreign Application Priority Data

Jan. 29, 2018   (NZ) .......................................... 739461
Jan. 28, 2019   (NZ) .......................................... 750242

(51) Int. Cl.
*A47G 19/22*     (2006.01)
*B29C 49/00*     (2006.01)
(Continued)

(52) U.S. Cl.
CPC .......... *B29C 49/12* (2013.01); *A47G 19/2288* (2013.01); *B29C 49/071* (2022.05);
(Continued)

(58) Field of Classification Search
CPC . B29C 49/6472; B29C 49/4273; B29C 69/00; B29C 49/0073; B29C 49/12;
(Continued)

(56) References Cited

U.S. PATENT DOCUMENTS 3,182,842 A    5/1965 Hug
3,612,346 A   10/1971 Schneider
(Continued)

FOREIGN PATENT DOCUMENTS

JP    S53114870    10/1978
JP    S54012866    5/1979
(Continued)

*Primary Examiner* — Monica A Huson
(74) *Attorney, Agent, or Firm* — Laubscher & Fretwell, P.C.

(57) ABSTRACT

A method and apparatus for the formation of double-walled containers with the structure of two integrally connected and adjacent containers extending in the same direction with an air gap between them, stretch-blow moulded as single bodies out of thermoplastic material, and suitable for mass-production. A thermoplastic tubular blank is formed and then heat-conditioned. The heat-conditioned tubular blank is then mechanically stretched longitudinally and blow-formed outwards by gas pressure to conformingly and stretchingly assume the tubular blank to the shape of a first dual-container shaped mould cavity set in order to form a stretch-blow moulded first container integrally connected to a second container, with both containers extending in opposite directions. Next, additional heat-conditioning is applied to further heat-condition as necessary the stretch-blow moulded second container and if deemed an advantage, at least part of the first container. Then at least one profiled inversion piston shaped as a male mould member with an outer surface configuration that defines the inner surface configuration of the article being formed and a second container shaped mould cavity set with a single-container shaped configuration are provided along with one or more wall stability devices which are applied to at least part of the wall surface(s) of either or both of the two integrally connected stretch-blow moulded containers, such that the second smaller container side wall(s) are at least substan-
(Continued)

tially not in contact with the second container shaped mould cavity set and may be inverted at least partially inside-out, while at the same time the second smaller container bottom wall at least substantially does not invert, in order for the second smaller container to become a substantially mirror-image inverted second smaller container extending in the same direction as, and interior to, the first container.

1 Claim, 24 Drawing Sheets

(51) Int. Cl.
  *B29C 49/12* (2006.01)
  *B29C 49/64* (2006.01)
  *B29K 623/00* (2006.01)
  *B29L 31/00* (2006.01)
(52) U.S. Cl.
  CPC .. *B29C 49/6472* (2013.01); *B29C 2949/0771* (2022.05); *B29C 2949/08* (2022.05); *B29K 2623/12* (2013.01); *B29L 2031/7132* (2013.01)
(58) Field of Classification Search
  CPC ............ B29C 2049/0089; B29C 49/06; B29C 2791/001; B29C 53/10; B29C 49/071; B29C 2949/0715; B29C 2949/08; B29C 2949/0771; B29B 11/14; B29B 2911/14426; A47G 19/2288; A47G 2019/2277; B29K 2623/12; B29K 2995/0015; B29L 2031/7158; B29L 2031/7166; B29L 2031/7132
  See application file for complete search history.

(56) References Cited

U.S. PATENT DOCUMENTS

| | | |
|---|---|---|
| 3,969,060 A | 7/1976 | Rosenkranz et al. |
| 4,035,461 A | 7/1977 | Korth |
| 4,889,752 A | 12/1989 | Beck |
| 6,423,253 B1 | 7/2002 | Bunel et al. |
| 6,499,311 B2 | 12/2002 | Mahajan |
| 6,612,458 B2 | 9/2003 | Balzer et al. |
| 7,717,697 B2 | 5/2010 | Hutchinson et al. |
| 9,339,979 B2 | 5/2016 | Crawley |
| 2021/0016488 A1 | 1/2021 | Tsuchiya |
| 2021/0309443 A1 | 10/2021 | Tsuchiya |

FOREIGN PATENT DOCUMENTS

| | | |
|---|---|---|
| JP | S5830969 A | 2/1983 |
| JP | S58203022 | 11/1983 |
| JP | 3929325 B2 | 6/2007 |
| JP | 2014028485 A | 2/2014 |
| WO | 2018078502 A1 | 5/2018 |

METHOD AND APPARATUS FOR INTEGRAL DOUBLE-WALLED CONTAINER STRUCTURES

This application is a continuation of application Ser. No. 16/965,144 filed Jul. 27, 2020. Application Ser. No. 16/965,144 is § 371 National Stage Entry of PCT/IB2019/052684 filed Jan. 28, 2019. PCT/IB2019/052684 claims priority of NZ750242 filed Jan. 29, 2019 and NZ739461 filed Jan. 21, 2018. The entire content of these applications is incorporated herein by reference.

FIELD OF THE INVENTION

This invention relates to a method and apparatus for the stretch-blow moulding of double-walled containers, formed as single bodies from thermoplastic resin tubular blanks, and which have the structure of two integrally connected and adjacent containers extending in the same direction and with an air gap between them, and more specifically, to a method and apparatus suitable for high-speed mass production, producing integral double-walled containers with very thin walls and with highly uniform wall thicknesses.

BACKGROUND OF THE INVENTION

According to Wikipedia, a container is "a basic tool consisting of any device creating a partially or fully enclosed space that can be used to contain, store, and transport objects or materials".

As used herein, the term container refers to any receptacle of hollow or concave inner structure that may be used to hold liquid and/or solid content, whether or not intended by design to hold such content, and includes at least; a mouth opening substantially on the container radial axis, at least one side wall disposed parallel to and/or at an angle to the container longitudinal axis, and a bottom wall substantially on the container radial axis, wherein the bottom wall may be a fully enclosed bottom wall that forms the bottom end of a fully enclosed container, or may be a partially enclosed bottom wall that forms the bottom end of a partially enclosed container. A partially enclosed bottom wall is where the bottom wall surface area is substantially greater than the average side wall surface area measured in the same radial plane. At the very least, a partially enclosed bottom wall may be a thickened rim section at the end of a side wall such as the mechanical and/or sealing connection feature(s) on a tubular blank.

As used herein, a container may be a beaker, bottle, bowl, canteen, cap, carafe, carton, clam-shell, cover, cup, fast-food container, food container, glass, hood, lid, mug, plate, pot or tumbler, or any other derivative of container denoting a partially or fully enclosed space capable of holding liquid and/or solid content.

As used herein, the term tubular denotes an object of substantially pipe-like or tube-like form, wherein the object is hollow in nature and substantially cylindrical in form, however this does not by definition mean that a tubular object is necessarily round or circular. A tubular object may be of any cross-sectional shape or form as required for any specific application and/or container design, including but by no means limited to round, circular, ovoid, triangular, square, rectangular, or any combination of geometrical and/or non-geometrical forms or shapes thereof radially and/or longitudinally.

The wording "double-walled container with the structure of two integrally connected and adjacent containers extending in the same direction with an air gap between them and formed as a single body" as used herein may equally be substituted with "integral double-walled container".

The wording "dual-container with the structure of two integrally connected containers extending in opposite directions and formed as a single body" as used herein may equally be substituted with "integral dual-container".

The term blow ratio as used herein may equally be substituted with expansion ratio and denotes the ratio between any given dimensional size of a tubular blank (or tubular slug) prior to blow-forming and the respective dimensional size of the container once blow-formed.

The wording "mould cavity set" as used herein denotes a mould which typically includes two substantially similar mould halves, however as will be apparent to those versed in the art, this should not be considered as limiting a mould cavity set to only two mould components. There may be any number of integral and/or separate parts that form a mould cavity set.

The word "air" as used herein denotes a gas used as part of an above atmospheric and/or below atmospheric pressure system, however as will be apparent to those versed in the art, this should not be considered as limiting such systems to the use of air only. There may be any number of gases or combinations of gases suitable for such usage.

There are countless low cost containers made globally each year which are suitable for mass-production. As regards low cost containers mass-produced by means of blow-forming from thermoplastic material, issues relating to low-cost production include but are by no means limited to:
  Low cost thermoformable plastic resin,
  Thin wall sections/light empty-weight,
  High production speed,
  Small production line footprint to enable small-cell production facilities that can be located adjacent to distribution centres, thereby minimising logistics costs,
  Production method based on primary processes,
  High degree of recyclability,
  Maximising stackability to minimise logistics and storage costs,
  Small number of subcomponent parts,
  Small number of production processes.

Currently, almost all mass-produced containers are single-walled by nature. The prime reasons are that current production processes are either incapable of making integral double-walled containers, or any production method currently utilised that may be capable of producing integral double-walled containers results in commercially cost-prohibitive production unit costs.

By way of example; a current method of thermoplastic cup production is by thermoforming, wherein pre-processed flat sheets of thermoplastic material are heated up towards the thermoplastics resin's softening temperature, but usually not above the melt temperature, and then gas pressure and/or mechanical stretching is applied to heat-form the flat sheet into container-shaped mould cavities. By this method, single-walled structures are readily formable out of flat sheets, however no known variation of the thermoforming process from flat sheets can viably create complete double-walled structures as this would require at least some of the wall structure to effectively shrink rather than stretch during heat-forming and this is contrary to the basis of the production method.

As another example, some bottle-shaped containers are produced by extrusion-blow moulding, wherein tubes of thermoplastic material that are above their melt temperature (molten) are extruded between container-shaped mould cavity sets and then while still in a molten state, gas pressure is applied to heat-form the molten thermoplastic resin into the cavities. The issues relative to mass production with this process are that molten tube extrusion is very slow and therefore high production speeds are not achievable, and while in the molten state, there is a practical limit to how thin-walled the final container can be. Typically for this process, wall thicknesses are substantially greater than 1 mm, which for mass-produced containers is commercially cost-prohibitive.

There are any number of market-driven reasons for the likes of an integral double-walled container with the structure of two integrally connected and adjacent containers with an air gap between them and formed as a single body, including but not limited to:

The formation of a fully recyclable coffee cup,

The formation of a cold cup that does not form condensation on outside walls,

The formation of a cold cup that can extend beverage shelf life, and

The formation of a container that extends the period that its contents remain hot or cold.

Using the cup genre within the boarder container sector as an example, and other than the widely used coffee-cup solution of a separate heat-sleeve to protect a user from burning their hand, the typical solution a user resorts to when addressing any of these needs is the placing of a cup inside a cup in order to form a "double-walled container with an air gap". From a mass production point of view, this "cup inside a cup" solution, as with the separate coffee-cup heat-sleeve, adds significant additional cost and leads to increased wastage, which is counter-productive to any recycling requirement.

For mass production and across all container genres, a cost-effective solution lies in the ability to form a container inside of a container, structured such that the two containers are formed as a single body, and whereby an air gap is formed between the two integral and adjacent containers.

BRIEF DESCRIPTION OF THE PRIOR ART

U.S. Pat. No. 3,182,842A teaches a double-walled container structure produced by extrusion-blow moulding, with various phases of production taught, all of which occur while the container remains in a molten state. Only when the full and complete double-walled container has been formed is the container allowed to cool sufficiently such that the thermoplastic resin is allowed to drop below its melt temperature and thereby solidify.

As already noted, extrusion-blow moulding is typified by low production speeds and substantially thick-walled finished products and rarely if ever has as a process been capable of producing low-cost mass-produced containers, however this was the main thermoplastic blow-forming methodology of the era when this patent was filed in 1963. Over ensuing decades, significant advances in blow-forming production methods have been derived that are more suitable for thin-walled structures.

U.S. Pat. No. 3,612,346 teaches a double-walled cup structure produced by thermoforming from pre-processed flat sheet, wherein a portion of the flat sheet is integrally formed into an exterior inversely tapered wall section covering at least part of the central cup section.

While this patent primarily teaches an inversely tapered section of external double-side-wall for assisting with vending machine cup stackability, the patent does show a cup with an inversely tapered exterior double-side-wall extending down past the bottom wall of the central cup section. As this patent is predicated on thermoforming cups from pre-processed flat sheet, this cup image as shown is unlikely to be producible as-taught as no known thermoplastic resin can heat-stretch in some areas under the application of heat and pressure (the central cup section) while at the exact same time heat-shrink in other areas (the inversely tapered exterior wall). Even if such thermoplastic resin existed, the inversely tapered exterior double-side-wall would not be of uniform wall thickness as depicted, but rather would have a substantially graduated wall thickness with the wall thickness increasing inversely to radial diameter decrease; as in thinner adjacent to the cup's drinking lip and thicker at the bottom edge.

In the unlikely event a method of thermoforming this cup as-taught from a flat sheet were found to be achievable, the resulting cup would be cost-prohibitive as a mass-produced container since thermoforming in itself cannot form ultra-thin cup walls and the graduated wall thickness of the inversely tapered exterior double-side-wall would significantly impact final cup empty-weight and thereby cup unit cost. As by example, a single-walled 500 ml cup for fast-food applications formed by thermoforming has a typical wall thickness in the order of 0.35 mm and a typical cup empty-weight in the order of 13 grams. With the addition of an integral inversely tapered exterior double-side-wall formed by shrink-forming from an initial flat sheet, likely cup empty-weight would be at least double the current typical cup weight.

U.S. Pat. No. 3,969,060 teaches a method of blow moulding bottles based on the deformation of a tubular slug of thermoplastic material. The slug is of tubular shape with only one open end and is produced in a separate injection-moulding process. At a later time and separate to the injection-moulding process, the tubular slug is heat-conditioned so that its temperature is in the heat-softened range but typically well below the thermoplastic resin's melt temperature, and once heat-conditioned to the desired temperature, the tubular slug is expanded outwardly under mechanical and/or gas pressure to stretchingly assume the cavity configuration of an external mould cavity set and thereby a finished bottle product is formed.

This process, which was first taught in approximately 1976, revolutionised the production of thin-walled bottles. When a thermoplastic resin needs to be above room temperature for heat-forming, it equally needs to be subsequently cooled back down to nearby room temperature post-forming and these heating and cooling times impact on overall production speed and therefore product unit cost. By blow-forming well below a thermoplastic resin's melt temperature, heat-up and cool-down times are significantly reduced as compared with extrusion blow-moulding, thereby overall production speed is significantly increased. In addition, thermoplastic resins typically stretch more uniformly when they are below their melt-temperature, so reliable production of significantly thinner-walled bottles became possible with the advent of this process. As an added bonus, the thinner the wall of the finished product, the quicker the product can be cooled back down to nearby room temperature.

With the advent of this process, known as "stretch blow-moulding", the process of extrusion blow moulding all-but disappeared relative to mass-produced bottle-shaped container production.

U.S. Pat. No. 9,339,979 teaches a double-walled thermal barrier cup thermoformed as a single piece out of thermoplastic material with at least one rib maintaining partial spacing between inner and outer walls, and with the as-formed cup having a sealed insulation space. While the cup formation process itself is not taught other than referring to "thermoforming", the patent does show the double-walled thermal barrier cup being formed from a tube with first and second open ends and being formed by using the application of heat, pressure and an external mould, and it does teach as-formed cups having wall thicknesses of about 0.35 mm.

It is well known by those versed in the art that when a heat-softened (but not molten) thermoplastic resin is blow-formed radially and longitudinally into a mould cavity, there is a practical limit as to how far a resin can reliably stretch under the application of gas pressure, with the practical blow ratio limit considered to be a 3 times expansion ratio between the initial tubular blank prior to blow-forming and the blow-formed finished product. It is equally well known by those versed in the art that prior to blow-forming a heat-softened thermoplastic resin, it may be mechanically stretched longitudinally by typically much more than a 3 time ratio. It is this combination of mechanical stretching then blow-forming of heat-softened thermoplastic resin that is the basis of current thin-walled container production.

In order to achieve very thin-walled container production, stretch-blow moulding is typically used rather than thermo-forming. The stretch-blow moulding of a tubular blank into a blow-formed container is a combination of:

Mechanical stretching in a longitudinal direction—herein defined as the Longitudinal Stretch ratio LS and herein calculated as L1/L0, where L1 is the tubular blank stretched length and L0 is the tubular blank initial length, and Gas pressure stretching in a longitudinal and/or radial direction—herein defined as the Radial Stretch ratio RS and herein calculated as R1/R0, where R1 is the circumference at any point after pressure stretching and R0 is the respective initial tubular blank circumference.

RSmax is herein defined as the largest value of RS occurring along the length of the tubular blank.

These two ratios can then herein be combined into an overall stretch-blow mould ratio RL calculated as RS/LS, with RLmax being the maximal RL calculable at any point along the tubular blank, herein calculated as RSmax/LS.

Primarily due to thermoplastic resin physical property constraints, if RSmax significantly exceeds 3 then typically container rupture occurs during blow-forming, and when mechanical stretch is present, LS is always greater than 1. Therefore, for viable blow-forming of very thin-walled containers, RLmax typically should not exceed 3.

In U.S. Pat. No. 9,339,979 there is no teaching of mechanical stretching of the heat-softened tubular blank prior to blow-forming, so as-taught the LS ratio is 1. In the Figures provided, the circumference of the tubular blank (depicted by means of the tube-shaped pinch-points in the cups two bottom walls) as compared with the largest circumference in the blow-formed cup product (the transition region between the two integrally formed cup shapes) depicts an RSmax considerably greater than 3. It would therefore be obvious to those versed in the art that the double-cup form as taught would be at-best highly impractical to blow-form due to both RSmax and RLmax being significantly greater than 3, and even if blow-formable without a high percentage rupturing, the resulting as-formed product would not have the uniform wall thickness depicted. While some areas such as the transition region may exhibit thin-walled properties, in all likelihood other regions such as the bottoms and adjacent side walls would be far from thin-walled in nature.

Considering alone that U.S. Pat. No. 9,339,979 describes blow-formed cups having a wall thickness of about 0.35 mm, the double-walled thermal barrier cup as-taught would be at least twice the weight of an existing thermoformed single-walled cup of comparable volumetric capacity and therefore would be commercially cost-prohibitive as a mass-produced container.

PCT/IB2017/056558 teaches a method for producing a double-walled container with the structure of two integrally connected and adjacent containers extending in the same direction with an air gap between them, and wherein the inversion of a second container is executed while fully enclosed inside of a second mould having a dual-container shaped cavity configuration.

The inversion process as taught applies an above atmospheric air pressure as means of stability control inside of a first container and second smaller container while inversion is executed, however, by utilising a second mould with a dual-container shaped configuration, at least part of the second smaller container mould cavity wall may be adjacent to the exterior wall of the second smaller container prior to and during inversion.

Such close proximity between a second smaller container wall and second mould cavity wall prior to and during inversion may result in the inverted second container wall exceeding the materials elastic limit and thereby wall damage may occur.

The object of the present invention is to overcome some of the disadvantages with the formation of integral double-walled containers with the structure of two integrally connected and adjacent containers with an air gap between them and formed as single bodies such that they become commercially viable as mass-produced thin-walled containers.

SUMMARY OF THE INVENTION

In accordance with a first aspect of the present invention there is provided a method and apparatus for the production of double-walled containers with the structure of two integrally connected and adjacent containers extending in the same direction with an air gap between them, stretch-blow moulded as single bodies out of thermoplastic material, and suitable for mass-production. Initially, a thermoplastic tubular blank with at least one open end is formed, wherein its RSmax is substantially 3 or less in order to minimise the wall thickness of both the tubular blank and of the integral double-walled container to be stretch-blow moulded. The tubular blank is allowed to cool sufficiently such that it drops below its melt temperature and thereby solidifies. The tubular blank is next heat-conditioned to a first heat-conditioned temperature within the heat-softened temperature range but below the melt temperature of the thermoplastic material. Once heat-conditioned, the tubular blank is then mechanically stretched in a longitudinal-axis direction with an LS substantially greater than 1, and blow-formed outwardly by gas pressure such that RLmax is less than 3, and preferably in the order of 1 or less. The longitudinal mechanical stretching combined with the longitudinal and/or radial gas pressure stretching conformingly and stretchingly assumes the tubular blank to the shape of a first dual-container shaped mould cavity set in order to form as an intermediate product a stretch-blow moulded integral dual-container with the structure of a first container and integrally connected second smaller container, with the first container and second smaller container extending in opposite directions from each other. Next, further heat-conditioning is applied to heat-condition the stretch-blow moulded second smaller container and if deemed an advantage, at least part of the first container to a second heat-conditioned temperature, where the second heat-conditioning may be a temperature range that includes heating and/or cooling as required. Then at least one profiled inversion piston and a second container shaped mould cavity set are provided along with one or more wall stability devices which are applied to at least part of the wall surface(s) of either or both of the two integrally connected stretch-blow moulded containers, such that the second smaller container side wall(s) may be inverted at least partially inside-out, while at the same time the second smaller container bottom wall at least substantially does not invert, in order for the second smaller container to become a substantially mirror-image inverted second smaller container extending in the same direction as, and interior to, the first container.

Alternately, a second smaller container may be manually inverted.

A tubular blank may have only one open end, in which case the first dual-container shaped mould cavity set may have at least two separate dual-container shaped mould cavity halves which may each include a first container cavity recess with a mouth opening, side wall(s) and a partial enclosed bottom wall and may all include small-radius wall-rigidity features and/or at least partial air gap sealing features, and a second smaller container shaped cavity recess with a mouth opening, side wall(s) and a fully enclosed bottom wall and may all include small-radius wall-rigidity features and/or at least partial air gap sealing features, with the two container shaped cavity recesses extending in opposite directions from each other and integrally connected.

A tubular blank may have a first and second open end, in which case the first dual-container shaped mould cavity set may instead include a first container cavity recess with a mouth opening, side wall(s) and a partially enclosed bottom wall and may all include small-radius wall-rigidity features and/or at least partial air gap sealing features, and a second smaller container cavity recess with a mouth opening, side wall(s) and a partially enclosed bottom wall and may all include small-radius wall-rigidity features and/or at least partial air gap sealing features, with the two container shaped cavity recesses extending in opposite directions from each other and integrally connected.

Whatever the format of the tubular blank, a second container shaped mould cavity set may have a dual-container shaped configuration with two separate dual-container shaped mould cavity halves which may each include at least one profiled inversion piston recess, a first container cavity recess with a mouth opening, side wall(s) and a partial enclosed bottom wall and may all include small-radius wall-rigidity features and/or at least partial air gap sealing features, and a second smaller container shaped cavity recess with a mouth opening, side wall(s) and a partially enclosed bottom wall and may all include small-radius wall-rigidity features and/or at least partial air gap sealing features, with the two container shaped cavity recesses extending in opposite directions from each other and integrally connected, and may include one or more devices for stretch-blow moulded first and/or second smaller container heat-conditioning and may include pathways for interconnection with at least one below atmospheric air pressure source.

Equally, a second container shaped mould cavity set may have a single-container shaped configuration with two separate single-container shaped mould cavity halves which may include a first container cavity recess with a mouth opening, side wall(s) and a partial enclosed bottom wall and may include small-radius wall-rigidity features and/or at least partial air gap sealing features, one or more devices for stretch-blow moulded first and/or second smaller container heat-conditioning, and pathways for interconnection with at least one below atmospheric air pressure source.

First container and/or second smaller container heat-conditioning may be by means of an increase in temperature and/or decrease in temperature in any one or more places in a first container and/or second smaller container.

Due to the combination of the mechanical stretch-phase prior to the blow-phase having an LS substantially greater than 1, the tubular blank having an RSmax substantially 3 or less, and the second smaller container inversion being assisted by the wall stability device(s) and the profiled inversion piston(s), an integral double-walled container which has the structure of two integrally connected and adjacent containers extending in the same direction with an air gap between them may be formed as a single body suitable for mass-production. The air gap so formed may be a partially sealed or an open air gap.

Additional production steps may be added at any sequence point, including but not limited to:
 The use of the wall stability device(s) and the profiled inversion piston(s) to stretchingly extend side-wall length of the inverted second smaller container,
 Cutting away any part or parts of either integrally connected container and/or the tubular blank by any method and for any reason,
 Converting any partially enclosed bottom wall into a fully enclosed bottom wall by any method and may result in a fully enclosed air gap being formed,
 Further inverting any features or wall sections in either integrally connected container by any method and for any reason and may result in a partially or fully enclosed air gap being formed,
 Adding an additional part or parts of any shape or form to either integrally connected container by any method and for any reason and may result in a partially or fully enclosed air gap being formed,
 Adding additional material or materials of any form, property or nature into the air gap by any method and for any reason including heat-insulation improvement and/or as part of user interactive features,
 The application of additional shaping/forming methods to ensure that the inverted second smaller container fully assumes its final design shape/form,
 Printing onto any surface of either integrally connected container by any method.

As heat-conditioned tubular blanks are stretched by mechanical and/or gas pressure devices in order to stretchingly conform them to a first dual-container shaped mould cavity set, at one or more locations they must;
 Be mechanically clamped sufficiently to enable them to be mechanically stretched, and
 Be sealingly clamped sufficiently such that gas pressure may be applied into their interior.

All tubular blank open ends may have mechanical clamping features, and at least one tubular blank open end may have sealing clamping features. Typically at least one open end of a tubular blank will be substantially round as this provides the most secure and efficient configuration for both mechanical and sealing attachment. However, other than at the open end(s), a tubular blank's circumferential shape may be any combination of geometric and/or non-geometric forms, or any change or changes in circumference, as intended by design and relative to tubular blank expansion according to the final blow-formed container shape.

When a tubular blank is stretchingly blow moulded into a first dual-container shaped cavity set, the larger the blow ratio, the more difficult it can be to achieve uniform as-blown container wall thicknesses. As will be obvious to those versed in the art, in substantially the middle region of a tubular blank from which the main part of a container is stretch-blow moulded, substantially uniform blow-forming is typically achieved and therefore fairly uniform container wall thicknesses in this zone are readily achievable. However, in the end-zones of a tubular blank which typically form container mouth openings and bottom walls, the larger the blow ratio, or in other words the smaller the size of the initial tubular blank with respect to the final container size, the more difficult it can be to achieve substantially uniform wall thickness in the matching zones of a container. Therefore, typically when the size of the tubular blank is substantially smaller than the final container size, thicker wall sections result near the container mouth opening and container bottom and thinner wall sections result in the middle of the container.

For the production of many bottle items this is not a problem, however for mass produced containers, lack of wall thickness uniformity directly translates into material waste and therefore commercially prohibitive product unit cost.

By ensuring that tubular blanks by design have an RSmax substantially 3 or less:
  Tubular blanks thereby have the thinnest wall thickness possible relative to the final container to be stretch-blow moulded,
  Tubular blank wall thickness is thereby further reduced by means of the mechanical stretch phase, and
  When the stretch-blow mould phase commences, tubular blanks stretch outwardly as uniformly as possible.

As a result of tubular blank design, the process apparatus and the production steps as taught herein, an integral double-walled container with the thinnest viable wall thickness and a high degree of wall thickness uniformity may be stretch-blow moulded, and thereby an integral double-walled container may be formed that is highly suitable for mass production. The intent is for the stretch-blow mould method and apparatus to achieve highly uniform average wall thicknesses significantly less than 0.35 mm, and preferably between 0.10 and 0.30 mm.

Factoring in thermoplastic resin cost and ease of recyclability, the preferred thermoplastic resin to be used by this method and apparatus is polypropylene (PP), however depending on the integral double-walled container's specific market application, any suitable thermoplastic resin may equally be used.

A thermoplastic resin used by this method and apparatus may be oil based or bio-based, clear/transparent, semi-transparent or opaque, of its natural resin colour or of any colour or combination of colours to suit an application, a single resin type or a blend of resin types, or any combination thereof.

Heat-conditioning to the first heat-conditioned temperature and second heat-conditioned temperature may be:
  An increase in temperature if by example tubular blanks and/or integral dual-containers are formed remotely to any relevant stage in an integral double-walled container forming sequence and thereby need to be heated upwards to heat-conditioned temperature,
  A decrease in temperature if by example tubular blanks and/or integral dual-containers are formed adjacent to or integral to any relevant stage in an integral double-walled container forming sequence and thereby need to be cooled downwards to heat-conditioning temperature, or
  Any combination thereof.

Preferably, the first heat-conditioned temperature is in the order of 80 to 100 degrees Centigrade and the second heat-conditioned temperature is in the order of 60 to 120 degrees Centigrade if heating is required and/or in the order of 0 to 20 degrees Centigrade if cooling is required. The first heat-conditioned temperature may be the same as the second heat-conditioned heat-temperature, or both may have different heat-conditioned temperatures.

Heat-conditioning, whether an increase in temperature or a decrease in temperature, may equally be applied to any one or more apparatus parts or sub-parts, such as by example only:
  Applying cooling to one or more regions in a mould cavity set in order to assist with returning a blow-formed integral dual-container to substantially room temperature once a tubular blank has conformingly and stretchingly assumed the shape of a first dual-container shaped mould cavity set,
  Applying cooling to a mechanical stretching device in order to counteract mechanical stretch device heat build-up that may lead to thin-walled tubular blank rupture during the mechanical stretch and/or gas pressure blow-forming phases.

Gas pressure blow-forming may commence following completion of longitudinal mechanical stretching, or gas pressure blow-forming may commence prior to completion of longitudinal mechanical stretching.

When containers are formed with very thin walls and a high degree of wall thickness uniformity, structural strength of the final container can be an issue. The more geometrically simple the curved or cylindrical wall form is in a container structure, typically the lower the wall rigidity and thereby the lower the rigidity of the container, such as with straight-sided bottle walls or conical cup walls which typically exhibit large-radius curves radially and are substantially linear in form longitudinally.

While thermoplastic resin selection can assist with wall rigidity, typically the more applicable thermoplastic resins for integral double-walled containers, such as PP, are of lower rather than higher rigidity. One way of increasing wall rigidity without impacting production piece cost is to introduce additional small-radius shapes or forms into finished product wall section design radially and/or longitudinally.

As regards the second smaller container, the requirement to invert this container from its stretch-blow moulded position extending in an opposite direction to the first container into a substantially mirror-image position interior to and extending in the same direction as the first container preferentially requires simple large-radius walls, as such wall shapes are readily invertible (as by example, inverting a plastic contact lens), given that even when in a heat-softened state, the more complicated the geometric shape/form, the greater the difficulty of inversion. Therefore, conical-shaped, cylindrical-shaped or high-radius compound curved cavity walls are preferred in a second smaller container cavity recess. While this may mean that an inverted second smaller container exhibits relatively low rigidity, it forms the interior container of an integral double-walled container structure and thereby has the primary function of holding liquid/solid content, hence as with comparable container formats such as the likes of the bag in a bag-in-box container, rigidity is of low importance.

As regards the first container, there is typically no requirement to invert this container, and again as compared with comparable container formats such as the likes of the box in a bag-in-box container, the outer container of an integral double-walled container structure has the primary function of structural strength, therefore preferentially a first container cavity recess may incorporate complex small-radius cavity wall features as a way to maximise thin-walled rigidity in a stretch-blow moulded integral double-walled container.

The prime purpose of an air gap between integrally connected and adjacent containers is to provide heat-insulation, both for keeping container contents hot such as for coffee cups, and for keeping container contents cold such as for fast-food cups and containers. However, hot and cold drinks are typically consumed relatively quickly, therefore a fully enclosed and sealed air gap is typically not necessary for the air gap to work effectively as a heat-insulation layer.

The term "fully enclosed" as taught in prior art presupposes that an integral double-walled container must have two fully enclosed bottom walls, however when a container is not being held in a user's hand, it is typically standing on a substantially flat surface or held in a transit carton or tray, and as such there is typically an at least substantially flat and totally separate surface underneath and directly adjacent to the base of an integral double-walled container, thereby effectively acting by proxy as a first container's fully enclosed bottom wall. Thus, there is typically little downside in a first container having only a partially enclosed bottom wall.

While the simplest form of an integral double-walled container formed as a result of the method and apparatus taught herein results in an open air gap, there is reason to have an at least partially enclosed air gap, particularly adjacent to a first container's partially enclosed bottom wall, with reasons including overall integral double-walled container structural integrity and heat-insulation improvement. As already characterised, an integral double-walled container is similar to a bag-in-box container format wherein the inverted second smaller container serves as the bag and the first container serves as the box. As an inverted second smaller container is typically thin-walled and with little if any additional wall-rigidity features, once liquid/solid content is placed inside the inverted second smaller container "bag", there is risk of it moving freely and adversely with respect to the first container "box". While this movement may not lead to structural failure of any kind, such relative movement might at the very least be unsettling to a user.

By incorporating into a first dual-container shaped mould cavity set at least one or more complex small-radius cavity wall features in the form of abrupt/small-radius changes extending inwards on a first container cavity recess wall(s), any movement in an inverted second smaller container with respect to its first container may be minimised and thereby overall structural integrity may be increased. The at least one or more complex small-radius cavity wall features in the form of inwardly extending abrupt/small-radius changes in a first container cavity recess wall(s) may result in a first container at least partially or engagingly making contact with its adjacent inverted second smaller container in any one or more places.

Such at least one or more complex small-radius cavity wall features in the form of inwardly extending abrupt/small-radius curvature changes in a first container cavity recess wall(s) may also serve to provide an air gap restriction in a finished integral double-walled container in order to provide at least partial or fully enclosed air gap sealing.

During the inversion process at least some portions of the bottom wall of a second smaller container do not necessarily need to invert, therefore a cavity recess for a second smaller container bottom wall may also include at least one or more complex small-radius cavity wall features in the form of abrupt/small-radius curvature cavity recess changes which may serve as a further way of reducing movement between adjacent integral containers in an integral double-walled container structure and/or as a further way of providing air gap restriction.

In order to form such advantageous wall features in a stretch-blow moulded integral double-walled container, a first dual-container shaped mould cavity set may include, but is by no means limited to:

One or more abrupt/small-radius changes in cavity wall shape and/or form radially and/or longitudinally or any angular orientation in between, One or more abrupt/small-radius changes in cavity wall shape and/or form extending any distance inwards and/or outwards from the mean surface of any cavity wall, Abrupt/small-radius changes in shape and/or form that are continuous and/or discontinuous in any direction, If extending inwards from a first container cavity wall, may extend a distance by design such that the stretch-blow moulded first container and its inverted second container when in their final integral double-walled container structural form extending in the same direction as each other may touchingly contact, engagingly contact or make no contact in any one or more places, or Any combination thereof.

Examples of complex small-radius mould cavity wall features include, but are by no means limited to:

Any form of logo, graphics design, lettering, promotional information or the like as part of a cavity wall, Any geometric or non-geometric shape or form as part of a cavity wall, Any abrupt changes in cavity wall height typified by a ridge being formed, Any abrupt changes in cavity wall height that equally abruptly returns to substantially the original cavity wall height in the same plane typified by a cavity rib or cavity channel, A raised or recessed thread form of any type as part of a cavity wall, Any combination thereof, or A complex geometric cavity wall feature in the form of an abrupt/small-radius change readily apparent to those versed in the art.

Additionally, by incorporating into a first dual-container shaped mould cavity set at least one or more user interactive wall features in the form of abrupt/small-radius wall changes extending inwards on a first container cavity recess wall(s), inversely matching user interactive features can be incorporated into a finished integral double-walled container.

Such first container wall user interactive features so formed may include but are by no means limited to:

Any form of inwardly extending curved or spirally threaded walls or the like,

Substantially right angle inwardly extending wall direction changes or the like, Interconnecting inwardly extending walls or the like, Abutting inwardly extending walls or the like, Any combination thereof, or Any user interactive inwardly extending wall features readily apparent to those versed in the art The resulting air gap between the first container and inverted second smaller container may additionally be used as an integral part of user interactive features in a final as-formed article, including but by no means limited to:
- The creation of an interactive maze by the addition of one or more ball-shaped objects, and/or any other alternate shaped object(s) capable of motion within the air gap space,
- As part of a drive-means to derive an upwards, downwards, forwards or backwards motion for any additional interactive component or components inserted into or suspended within the air gap, such drive-means only as a result of user movement of the finished integral double-walled container,
- As part of a drive-means to derive an upwards, downwards, forwards or backwards motion for any additional interactive component or components inserted into the air gap, such drive-means forming part of interactive component movement as a result of user interaction, such user interaction including direct user contact with the additional interactive component or components inserted into the air gap,
- Any combination thereof, or
- Any other integral interactive features readily apparent to those versed in the art.

During the stretch-blow-moulding phase, heat-conditioned tubular blanks with only one open end are outwardly expanded by mechanical and/or gas pressure such that they stretchingly conform to the shape of a first dual-container shaped mould cavity set. For such integral double-walled containers, a first dual-container shaped mould cavity set typically includes integral and interconnected cavity recesses that include but are by no means limited to:
- A large-aperture recess for mechanical and/or sealing engaging-connection to the one open end of the tubular blank,
- An engagingly connected first container cavity recess including a mouth opening zone, side wall zone(s) and a partially enclosed bottom wall zone that may all include small-radius cavity wall features for any purpose,
- An engagingly connected second smaller container cavity recess including a mouth opening zone, side wall zone(s) and a fully enclosed bottom wall zone that may all include small-radius cavity wall features for any purpose,
- With the first and second smaller container cavity recesses extending in opposite directions from each other.

Alternately during the stretch-blow-moulding phase, heat-conditioned tubular blanks with a first and second open end are outwardly expanded by mechanical and/or gas pressure such that they stretchingly conform to the shape of a first dual-container shaped mould cavity set. For such integral double-walled containers, a first dual-container shaped mould cavity set typically includes integral and interconnected cavity recesses that include but are by no means limited to:
- A large-aperture recess for mechanical and/or sealing engaging-connection to the first open end of a tubular blank,
- An engagingly connected first container cavity recess including a mouth opening zone, side wall zone(s) and a partially enclosed bottom wall zone that may all include small-radius cavity wall features for any purpose,
- An engagingly connected second smaller container cavity recess including a mouth opening zone, side wall zone(s) and a partially enclosed bottom wall zone that may all include small-radius cavity wall features for any purpose,
- With the first and second smaller container cavity recesses extending in opposite directions from each other,
- And an engagingly connected large-aperture recess for mechanical and/or sealing engaging-connection to the second open end of a tubular blank.

During the second smaller container inversion phase, heat-conditioned second smaller containers are at least partially inverted inside-out. A second container shaped mould cavity set may be a dual-container shaped configuration which typically includes integral and interconnected cavity recesses that include but are by no means limited to:
- A large-aperture recess for mechanical and/or sealing engaging-connection to the partially enclosed bottom wall of a first container,
- An engagingly connected first container cavity recess including a mouth opening zone, side wall zone(s) and a partially enclosed bottom wall zone that may all include small-radius cavity wall features for any purpose,
- An engagingly connected second smaller container cavity recess including a mouth opening zone, side wall zone(s) and a partially enclosed bottom wall zone that may all include small-radius cavity wall features for any purpose,
- With the first and second smaller container cavity recesses extending in opposite directions from each other,
- And at least one engagingly connected profiled inversion piston recess, which forms part of the second smaller container bottom wall zone,
- And may further include,
- At least one first container and/or second smaller container heat-conditioning device capable of an increase and/or decrease in first and/or second smaller container temperature, and
- At least one pathway for interconnection with at least one below atmospheric air pressure source.

A second smaller container cavity recess may be slightly smaller than its respective first container cavity recess, or a second smaller container cavity recess may be substantially smaller than its respective first container cavity recess. A second smaller container cavity recess may have substantially the same shape/form as its respective first container cavity recess, or a second smaller container cavity recess may have a substantially different or totally different shape/form to its respective first container cavity recess.

Alternately, a second container shaped mould cavity set may be a single-container shaped configuration which typically includes integral and interconnected cavity recesses that include but are by no means limited to:
- A large-aperture recess for mechanical and/or sealing engaging-connection to the partially enclosed bottom wall of a first container,
- An engagingly connected first container cavity recess including a mouth opening zone, side wall zone(s) and a partially enclosed bottom wall zone that may all include small-radius cavity wall features for any purpose,
- And may further include,
- At least one first container and/or second smaller container heat-conditioning device capable of an increase and/or decrease in first and/or second container temperature, and
- At least one pathway for interconnection with at least one below atmospheric air pressure source.

The cavity halves of a second container shaped mould cavity set may be exact mirror image copies of each other, or the cavity halves of a second container shaped mould cavity set may be of different cavity shapes/forms to each other.

For high speed production, it is typically preferable to have a larger number of quick steps in a production sequence rather than a smaller number of slow steps, as for any production sequence, overall production throughput is typically determined by the slowest step. It is therefore preferable for the method and apparatus for the production of integral double-walled containers to include first and second container shaped mould cavity sets in order to achieve the fastest possible production sequence cycle-time and thereby the lowest production piece cost, however as will be apparent to those versed in the art, a single container shaped mould cavity set combining all features and functions of the two container shaped mould cavity sets may equally be used. Alternately, more than two container shaped mould cavity sets may be employed in a production sequence.

In order to ensure optimal inversion of a second smaller container, it is important to control wall stability in the region where inverting and non-inverting wall sections engagingly connect:

Where full inversion of a second smaller container into a full mirror-image position is desired, the region for wall stability control in a second container shaped mould cavity set is the connection region between the mouth opening zones of the first container and second smaller container, Where only partial inversion of a second smaller container into a substantially mirror-image position is desired, the region for wall stability control in a second container shaped mould cavity set is wherever deemed necessary by design with respect to the final integral double-walled container shape to be formed.

Wherever the region for wall stability control is located within a second container shaped mould cavity set, it is important to keep the relevant stretch-blow moulded wall region or regions as physically stable as possible in order for a second smaller container to be inverted in an orderly manner, with the inversion process being to:

Begin with invertingly pushing with at least one profiled inversion piston on the bottom wall of a second smaller container such that the bottom wall remains at least substantially non-inverted and moves first in a longitudinal axis direction towards the mouth opening, Followed by an orderly inversion of the side wall(s), progressively starting from the bottom wall end of the side wall(s) heading towards the mouth opening end of the side wall(s), and Finally ending with the inversion of the mouth opening or wherever else the inversion is intended by design to conclude.

A profiled inversion piston may have any shape/form necessary to aid inversion ranging from a flat pushing face through to a fully profiled shape that conforms to the final interior inverted wall shape.

The preferred profile of a profiled inversion piston is a male mould member having an outer surface configuration which defines an inner surface configuration of an article being formed.

A male mould member surface configuration can be conical, convex, concave, and/or any other configuration or combination of configurations thereof.

As a preferred profiled inversion piston defines the inner surface of an article being formed, once inverted, the inner surface configuration of the article being formed conformally engages with the outer surface configuration of the profiled inversion piston thereby retraction of the profiled inversion piston from its position interior to the as-formed article may require one or more means of retraction assistance. Any number of such means of retraction assistance are well known to those versed in the art and are typically referred to as "ejection mechanisms".

The preferred ejection mechanisms during retraction are compressed air applied into the conformal engagement region and/or any form of mechanical ejection means.

During the ejection process as means of assisting the outer surface configuration of a profiled inversion piston to release its conformal engagement with the inner surface configuration of an article now formed, it is important to not affect the shape, form or stability of the now inverted second smaller container. To this end, at least one inverted second container stability device may be used to provide stability to the now inverted second smaller container during the application of any one or more ejection mechanisms.

There may be a tendency for heat build-up in a profiled inversion piston as a result of it defining the inner surface configuration of an article being formed in combination with any residual heat-conditioning remaining in the article being formed. Any one or more forms of cooling means known to those versed in the art may be incorporated into and/or adjacent to a profiled inversion piston to counteract such heat build-up.

Wall stability control devices within a second container shaped mould cavity set include, but are not limited to:

Appling a higher than atmospheric air pressure interior to a second container shaped mould cavity set in order to provide a higher than atmospheric air pressure interior to a stretch-blow moulded integral dual-container during inversion, Applying lower than atmospheric air pressure via a second container shaped mould cavity set to any one or more exterior stretch-blow moulded integral dual-container wall surfaces in the region or regions required for wall stability control, Applying cooling in any one or more places in a second container shaped mould cavity set, Using at least one of the apertures into a second container shaped mould cavity set for the insertion of at least one flexible wall surface support structure interior to a second container shaped mould cavity set in order to provide mechanical wall stability against relevant interior stretch-blow moulded integral dual-container wall surfaces and/or may have at least one head-shape so shaped/formed in order to assist with the formation of the final inversion shape/form desired at the point of intersection of inverting and non-inverting walls, Any combination thereof, or Any other second container shaped mould cavity set wall stability control apparent to those versed in the art.

Air pressure higher than atmospheric pressure is currently used for wall stability control during wall inversion with stretch-blow-moulded bottles, such as for the creation of integral handle-regions. However, typically the wall inversion volumetric size relative to the overall volume of the blow-formed bottle is small and therefore any internal air pressure differential that arises as a result of wall-inversion is readily controllable.

For integral double-walled container structures however, the difference in internal volume between the stretch-blow moulded first container and integral second smaller container extending in opposite directions and the final integral double-walled container where the first container and interior inverted second smaller container extend in the same direction is substantial—and is typically more than a 10 times volumetric differential. Given that for high-speed production the requirement is for inversion to occur as quickly as possible, internal air pressure build-up between these two vastly different internal volumes may be difficult at best to control.

In the event that rate of change of internal air pressure can be directly controlled during inversion, this may be by fast-acting pneumatic control devices such as pressure regulators and/or relief valves. However, where rate of change in internal air pressure exceeds the ability of fast-acting pneumatic devices to reliably control, an inversion apparatus stage may incorporate one or more separate pressure chambers that engagingly interconnect with the interior of the stretch-blow moulded first container and integral second smaller container such that their combined internal volume is substantially greater than the internal volume itself of the stretch-blow moulded first container and integral second smaller container. In this way, as the second smaller container is inverted, the substantial internal volume change of the stretch-blow moulded integral double-walled container due to inversion results in only a small overall volume change in the combined internal volume, and thereby internal air pressure changes during inversion may be minimised and thereby readily controlled. Any combination of pneumatic control devices and/or one or more pressure chambers may be used.

At least one of the apertures into a second container shaped mould cavity set may be used to insert at least one flexible surface support structure interior to a second container shaped mould cavity set in order to provide interior wall surface stability for the stretch-blow moulded integral double-walled container during inversion. The one or more flexible surface support structures may be spring-loaded by any method in order to springly and engagingly contact them with the relevant interior wall surface(s) of a stretch-blow moulded integral dual-container in the regions where wall surface stability is required. The one or more flexible surface support structures may be flexibly inserted and/or flexibly withdrawn at any point prior to, during or following inversion.

The at least one flexible surface support structure interior to a second container shaped mould cavity set may include interior former shaping to ensure that the transition region between inverting and non-inverting walls is formed to design requirements.

While the one or more flexible surface support structures remain springly and engagingly in contact with the interior wall surface(s) of a now inverted integral double-walled container and by whatever method a now inverted second smaller container remains in a heat-conditioned state, a profiled inversion piston may be further extended in the inverting direction thereby causing at least part of the bottom wall and/or the side wall(s) of a now partially or fully inverted second smaller container to be stretchingly lengthened. By this means, the internal volume of a now partially or fully inverted second smaller container may be increased while at the same time the wall thickness of its side wall(s) is reduced. Thus, for any given target container volumetric capacity, overall final integral double-walled container empty-weight may be further reduced and thereby production unit cost similarly reduced. Second smaller container wall stretching may occur before, during and/or after wall inversion. The same profiled inversion piston may be used for wall stretching, or a separate profiled piston may be used for side wall stretching.

In the event a process step needs to be added to convert at least one partially enclosed bottom wall into a fully enclosed bottom wall, this may be by:
  Press-fitting of additional bottom walls of any suitable material,
  Gluing or welding of additional bottom walls of any suitable material,
  Over-moulding of additional bottom walls of substantially the same material or any material with suitable molecular bonding properties,
  Formation of additional bottom walls by the heat-deformation of parts of the original tubular blank,
  Any combination thereof, or
  Adding additional bottom walls as apparent to those versed in the art.

In the event a further process step needs to be added to at least partially or fully enclose an air gap, this may be by:
  The additional inversion of any existing wall feature,
  Any form of welding process,
  Any form of gluing process,
  The addition of any form of sealing compound,
  The attachment of adhesive labelling,
  Any combination thereof, or
  Any form of additional methods for sealing readily apparent to those versed in the art In the event a further process step needs to be added to improve the heat-insulation properties of and/or add user interactive features to an air gap, this may be by the addition of any one or more insulation and/or non-insulation compounds into an air gap at any point in the production sequence, including but not limited to;
  Gaseous compounds,
  Liquid compounds,
  Solid compounds, or
  Any combination thereof.

During production, a tubular blank may fully and completely be formed into an integral double-walled container, or one or more post-processes may be used to cut away unwanted/unused parts of a tubular blank and/or cut away any blow-formed wall parts for whatever reason in order for form a finished integral double-walled container. As by example, the mechanical and/or sealing clamp area of a tubular blank may at some point in a production sequence be at least substantially cut away.

A further process step may be added in order to attachingly add by any device or method one or more additional features, elements, walls, or sub-components to an integral double-walled container. As by example only, an integral double-walled container may have a process step that attachingly adds at any point in a production sequence the likes of:
  Cup bases,
  Cup handles,
  Integral lid parts,
  Glass stems,
  Promotional items of any kind,
  Any combination thereof, or
  Any additional feature, element, wall, or sub-component apparent to those versed in the art.

In the event following inversion an inverted second smaller container does not fully invert into the shape/form desired, one or more further process steps may employ the use of one or more separate devices to improve the final inverted shape/form, including but not limited to:

One or more formers of any kind,
The application of internal and/or external air pressure,
Any combination thereof, or
Any shape/forming correction method or device apparent to those versed in the art.

The process steps for forming an integral double-walled container may occur as in-line process steps, as adjacent process steps, or as remote process steps, or any combination thereof. It is preferred that the process steps occur in-line and/or adjacent to each other. Each process step and apparatus device may occur once only in a production sequence in any order, or any one or more process steps and/or apparatus device may occur multiple times, ether sequentially of non-sequentially as required in order to achieve the most efficient overall production throughput. Any one or more process steps as taught herein may be combined together or separated into sub-steps as required.

The prime market applications for integral double-walled containers formed as a result of the method and apparatus herein taught include, but are not limited to:
- As a cup and/or lid for fast food and coffee retail outlets,
- As a bottle or pottle for perishable foodstuffs,
- As a bottle or pottle for pharmaceuticals, chemicals and cosmetics,
- As a container for fast foods,
- As a secondary packaging cup, bottle or container for any market sector.

In a first preferred embodiment, there is provided a method and apparatus for the production of double-walled containers with the structure of two integrally connected and adjacent containers extending in the same direction with an air gap between them, stretch-blow moulded as single bodies out of thermoplastic material, and suitable for mass-production. Initially, a thermoplastic tubular blank with one open end is formed, wherein its RSmax is substantially 3 or less in order to minimise the wall thickness of both the tubular blank and of the integral double-walled container to be stretch-blow moulded. The tubular blank is allowed to cool sufficiently such that it drops below its melt temperature and thereby solidifies. The tubular blank is next heat-conditioned to a first heat-conditioned temperature within the heat-softened temperature range but below the melt temperature of the thermoplastic material. Once heat-conditioned, the tubular blank is then mechanically stretched in a longitudinal-axis direction with an LS substantially greater than 1, and blow-formed outwardly by gas pressure such that RLmax is less than 3, and preferably in the order of 1 or less. The longitudinal mechanical stretching combined with the longitudinal and/or radial gas pressure stretching conformingly and stretchingly assumes the tubular blank to the shape of a first dual-container shaped mould cavity set in order to form as an intermediate product a stretch-blow moulded integral dual-container with the structure of a first container and integrally connected second smaller container, with the first container and second smaller container extending in opposite directions from each other. Next, further heat-conditioning is applied to heat-condition the stretch-blow moulded second smaller container and if deemed an advantage, at least part of the first container to a second heat-conditioned temperature. Then at least one profiled inversion piston and a second dual-container shaped mould cavity set are provided along with one or more wall stability devices which are applied to at least part of the wall surface(s) of either or both of the two integrally connected stretch-blow moulded containers, such that the second smaller container side wall(s) may be inverted at least partially inside-out, while at the same time the second smaller container bottom wall at least substantially does not invert, in order for the second smaller container to become a substantially mirror-image inverted second smaller container extending in the same direction as, and interior to, the first container. Alternately, a second smaller container may be manually inverted.

A first dual-container shaped mould cavity set typically includes integral and interconnected cavity recesses that include but are by no means limited to:
- A large-aperture recess for mechanical and/or sealing engaging-connection to the one open end of a tubular blank,
- An engagingly connected first container cavity recess including a mouth opening zone, side wall zone(s) and a partially enclosed bottom wall zone that may all include small-radius cavity wall features for any purpose,
- An engagingly connected second smaller container cavity recess including a mouth opening zone, side wall zone(s) and a fully enclosed bottom wall zone that may all include small-radius cavity wall features for any purpose,
- With the first and second smaller container cavity recesses extending in opposite directions from each other.

A second dual-container shaped mould cavity set typically includes integral and interconnected cavity recesses that include but are by no means limited to:
- A large-aperture recess for mechanical and/or sealing engaging-connection to the partially enclosed bottom wall of a stretch-blow moulded first container,
- An engagingly connected first container cavity recess including a mouth opening zone, side wall zone(s) and a partially enclosed bottom wall zone that may all include small-radius cavity wall features for any purpose,
- An engagingly connected second smaller container cavity recess including a mouth opening zone, side wall zone(s) and a partially enclosed bottom wall zone that may all include small-radius cavity wall features for any purpose,
- With the first and second smaller container cavity recesses extending in opposite directions from each other,
- And at least one engagingly connected profiled inversion piston recess, which forms part of the second smaller container bottom wall zone,
- And may further include,
- At least one first container and/or second smaller container heat-conditioning device, and
- At least one pathway for interconnection with at least one below atmospheric air pressure source.

Due to the combination of the mechanical stretch-phase prior to the blow-phase having an LS substantially greater than 1, the tubular blank having an RSmax substantially 3 or less, and the second smaller container inversion being assisted by the wall stability device(s) and the profiled inversion piston(s), an integral double-walled container which has the structure of two integrally connected and adjacent containers extending in the same direction with an air gap between them may be formed as a single body suitable for mass-production. The air gap so formed may be a partially sealed or an open air gap.

Additional production steps may be added at any sequence point, including but not limited to:
- The use of the wall stability device(s) and the profiled inversion piston(s) to stretchingly extend side-wall length of the inverted second smaller container, Cutting away any part or parts of either integrally connected container and/or the tubular blank by any method and for any reason, Converting any partially enclosed bottom wall into a fully enclosed bottom wall by any method and may result in a fully enclosed air gap being formed, Further inverting any features or wall sections in either integrally connected container by any method and for any reason and may result in a partially or fully enclosed air gap being formed, Adding an additional part or parts of any shape or form to either integrally connected container by any method and for any reason and may result in a partially or fully enclosed air gap being formed, Adding additional material or materials of any form, property or nature into the air gap by any method and for any reason including heat-insulation improvement and/or as part of user interactive features, The application of additional shaping/forming methods to ensure that the inverted second smaller container fully assumes its final design shape/form, Printing onto any surface of either integrally connected container by any method.

In a second preferred embodiment, there is provided a method and apparatus for the production of dual-containers with the structure of two integrally connected and adjacent containers extending in the same direction with an air gap between them, stretch-blow moulded as single bodies out of thermoplastic material, and suitable for mass-production. Initially, a thermoplastic tubular blank with a first and second open end is formed, wherein its RSmax is substantially 3 or less in order to minimise the wall thickness of both the tubular blank and of the integral double-walled container to be stretch-blow moulded. The tubular blank is allowed to cool sufficiently such that it drops below its melt temperature and thereby solidifies. The tubular blank is next heat-conditioned to a first heat-conditioned temperature within the heat-softened temperature range but below the melt temperature of the thermoplastic material. Once heat-conditioned, the tubular blank is then mechanically stretched in a longitudinal-axis direction with an LS substantially greater than 1, and blow-formed outwardly by gas pressure such that RLmax is less than 3, and preferably in the order of 1 or less. The longitudinal mechanical stretching combined with the longitudinal and/or radial gas pressure stretching conformingly and stretchingly assumes the tubular blank to the shape of a first dual-container shaped mould cavity set in order to form as an intermediate product a stretch-blow moulded integral dual-container with the structure of a first container and integrally connected second smaller container, with the first container and second smaller container extending in opposite directions from each other. Next, further heat-conditioning is applied to heat-condition the stretch-blow moulded second smaller container and if deemed an advantage, at least part of the first container to a second heat-conditioned temperature. Then at least one profiled inversion piston and a second dual-container shaped mould cavity set are provided along with one or more wall stability devices which are applied to at least part of the wall surface(s) of either or both of the two integrally connected stretch-blow moulded containers, such that the second smaller container side wall(s) may be inverted at least partially inside-out, while at the same time the second smaller container bottom wall at least substantially does not invert, in order for the second smaller container to become a substantially mirror-image inverted second smaller container extending in the same direction as, and interior to, the first container. Alternately, a second smaller container may be manually inverted.

A first dual-container shaped mould cavity set typically includes integral and interconnected cavity recesses that include but are by no means limited to:

A large-aperture recess for mechanical and/or sealing engaging-connection to the first open end of a tubular blank, An engagingly connected first container cavity recess including a mouth opening zone, side wall zone(s) and a partially enclosed bottom wall zone that may all include small-radius cavity wall features for any purpose, An engagingly connected second smaller container cavity recess including a mouth opening zone, side wall zone(s) and a partially enclosed bottom wall zone that may all include small-radius cavity wall features for any purpose, With the first and second smaller container cavity recesses extending in opposite directions from each other, And an engagingly connected large-aperture recess for mechanical and/or sealing engaging-connection to the second open end of a tubular blank.

A second dual-container shaped mould cavity set typically includes integral and interconnected cavity recesses that include but are by no means limited to:

A large-aperture recess for mechanical and/or sealing engaging-connection to the partially enclosed bottom wall of a stretch-blow moulded first container, An engagingly connected first container cavity recess including a mouth opening zone, side wall zone(s) and a partially enclosed bottom wall zone that may all include small-radius cavity wall features for any purpose, An engagingly connected second smaller container cavity recess including a mouth opening zone, side wall zone(s) and a partially enclosed bottom wall zone that may all include small-radius cavity wall features for any purpose, With the first and second smaller container cavity recesses extending in opposite directions from each other, And at least one engagingly connected profiled inversion piston recess, which forms part of the second smaller container bottom wall zone, And may further include, At least one first container and/or second smaller container heat-conditioning device, and At least one pathway for interconnection with at least one below atmospheric air pressure source.

Due to the combination of the mechanical stretch-phase prior to the blow-phase having an LS substantially greater than 1, the tubular blank having an RSmax substantially 3 or less, and the second smaller container inversion being assisted by the wall stability device(s) and the profiled inversion piston(s), an integral double-walled container which has the structure of two integrally connected and adjacent containers extending in the same direction with an air gap between them may be formed as a single body suitable for mass-production. The air gap so formed may be a partially sealed or an open air gap.

Additional production steps may be added at any sequence point, including but not limited to:

The use of the wall stability device(s) and the profiled inversion piston(s) to stretchingly extend side-wall length of the inverted second smaller container, Cutting away any part or parts of either integrally connected container and/or the tubular blank by any method and for any reason, Converting any partially enclosed bottom wall into a fully enclosed bottom wall by any method and may result in a fully enclosed air gap being formed, Further inverting any features or wall sections in either integrally connected container by any method and for any reason and may result in a partially or fully enclosed air gap being formed, Adding an additional part or parts of any shape or form to either integrally connected container by any method and for any reason and may result in a partially or fully enclosed air gap being formed, Adding additional material or materials of any form, property or nature into the air gap by any method and for any reason including heat-insulation improvement and/or as part of user interactive features, The application of additional shaping/forming methods to ensure that the inverted second smaller container fully assumes its final design shape/form, Printing onto any surface of either integrally connected container by any method.

In a third preferred embodiment, there is provided a method and apparatus for the production of double-walled containers with the structure of two integrally connected and adjacent containers extending in the same direction with an air gap between them, stretch-blow moulded as single bodies out of thermoplastic material, and suitable for mass-production. Initially, a thermoplastic tubular blank with one open end is formed, wherein its RSmax is substantially 3 or less in order to minimise the wall thickness of both the tubular blank and of the integral double-walled container to be stretch-blow moulded. The tubular blank is allowed to cool sufficiently such that it drops below its melt temperature and thereby solidifies. The tubular blank is next heat-conditioned to a first heat-conditioned temperature within the heat-softened temperature range but below the melt temperature of the thermoplastic material. Once heat-conditioned, the tubular blank is then mechanically stretched in a longitudinal-axis direction with an LS substantially greater than 1, and blow-formed outwardly by gas pressure such that RLmax is less than 3, and preferably in the order of 1 or less. The longitudinal mechanical stretching combined with the longitudinal and/or radial gas pressure stretching conformingly and stretchingly assumes the tubular blank to the shape of a first dual-container shaped mould cavity set in order to form as an intermediate product a stretch-blow moulded integral dual-container with the structure of a first container and integrally connected second smaller container, with the first container and second smaller container extending in opposite directions from each other. Next, further heat-conditioning is applied to heat-condition the stretch-blow moulded second smaller container and if deemed an advantage, at least part of the first container to a second heat-conditioned temperature, where the second heat-conditioning may be a temperature range that includes heating and/or cooling as required. Then at least one profiled inversion piston shaped as a male mould member with an outer surface configuration that defines the inner surface configuration of the article being formed and a second container shaped mould cavity set with a single-container shaped configuration are provided along with one or more wall stability devices which are applied to at least part of the wall surface(s) of either or both of the two integrally connected stretch-blow moulded containers, such that the second smaller container side wall(s) are substantially not in contact with the second container shaped mould cavity set and may be inverted at least partially inside-out, while at the same time the second smaller container bottom wall at least substantially does not invert, in order for the second smaller container to become a substantially mirror-image inverted second smaller container extending in the same direction as, and interior to, the first container. Alternately, a second smaller container may be manually inverted.

A first dual-container shaped mould cavity set typically includes integral and interconnected cavity recesses that include but are by no means limited to:

A large-aperture recess for mechanical and/or sealing engaging-connection to the one open end of a tubular blank, An engagingly connected first container cavity recess including a mouth opening zone, side wall zone(s) and a partially enclosed bottom wall zone that may all include small-radius cavity wall features for any purpose, An engagingly connected second smaller container cavity recess including a mouth opening zone, side wall zone(s) and a fully enclosed bottom wall zone that may all include small-radius cavity wall features for any purpose, With the first and second smaller container cavity recesses extending in opposite directions from each other.

By incorporating into a first dual-container shaped mould cavity set at least one or more user interactive wall features in the form of abrupt/small-radius wall changes extending inwards on a first container cavity recess wall(s), inversely matching user interactive features can be incorporated into a finished integral double-walled container.

Such first dual-container shaped mould cavity user interactive wall features may include but are by no means limited to:

Any form of inwardly extending curved or spirally threaded walls or the like,

Substantially right angle inwardly extending wall direction changes or the like, Interconnecting inwardly extending walls or the like, Abutting inwardly extending walls or the like, Any combination thereof, or Any user interactive inwardly extending wall features readily apparent to those versed in the art The resulting air gap between the first container and inverted second smaller container may additionally be used as an integral part of user interactive features in a final as-formed article, including but by no means limited to:

The creation of an interactive maze by the addition of one or more ball-shaped objects, and/or any other alternate shape of object or objects capable of motion within the air gap space, As part of a drive-means to derive an upwards, downwards, forwards or backwards motion for any additional interactive component or components inserted into or suspended within the air gap, such drive-means only as a result of user movement of the finished integral double-walled container, As part of a drive-means to derive an upwards, downwards, forwards or backwards motion for any additional interactive component or components inserted into the air gap, such drive-means forming part of interactive component movement as a result of user interaction, such user interaction including direct user contact with the additional interactive component or components inserted into the air gap, Any combination thereof, or Any other integral interactive features readily apparent to those versed in the art.

A second container shaped mould cavity set with a single-container shaped configuration typically includes integral and interconnected cavity recesses that include but are by no means limited to:

A large-aperture recess for mechanical and/or sealing engaging-connection to the partially enclosed bottom wall of a stretch-blow moulded first container, An engagingly connected first container cavity recess including a mouth opening zone, side wall zone(s) and a partially enclosed bottom wall zone that may all include small-radius cavity wall features for any purpose, And may further include, At least one first container and/or second smaller container heat-conditioning device, where the heat conditioning may be the application of heat, the application of cooling, or any combination thereof, and At least one pathway for interconnection with at least one below atmospheric air pressure source.

The single-container shaped configuration of the second container shaped mould cavity set substantially encases the first container of the intermediate stretch-blow moulded integral dual-container whilst the second smaller container remains substantially free and clear of the second container shaped mould and thereby substantially unenclosed.

With the second smaller container substantially unenclosed:

Any form or combination of forms of contact and/or non-contact heating can be used to heat condition the second smaller container, whether located interior to, exterior to or both interior and exterior to the second smaller container, and such second smaller container heat conditioning may remain in effect during part of or all of the inversion process, Higher than atmospheric air pressure internally can be used as a means of wall stability control to enable the second smaller container to stretchingly and elastically expand freely outwards thereby improving the ability of the second smaller container to invert without sustaining wall-damage, Lower than atmospheric air pressure externally can be used as a means of wall stability control to enable the second smaller container to stretchingly and elastically expand freely outwards thereby improving the ability of the second smaller container to invert without sustaining wall-damage, Or any combination thereof.

The preferred means of heat conditioning the second container shaped mould cavity set is by the application of liquid cooling.

The preferred means of heat conditioning the second smaller container of the intermediate stretch-blow moulded integral dual-container is by Infra-Red Heating.

Tests have shown that during wall inversion of a second smaller container, any opportunity for any part of an inverting wall to move in a random direction with respect to any other part of an inverting wall may result in at least part of a wall exceeding the materials elastic limit and wall damage thereby occurs.

When a second smaller container is free to elastically expand outwards prior to and during inversion due to the application of wall stability control in the form of interior above atmospheric air pressure and/or exterior below atmospheric air pressure, and inversion is effected by a profiled inversion piston(s) shaped as a male mould member with an outer surface configuration that defines the inner surface configuration of the article being formed, at all times inverting wall(s) of a second smaller container are constrained to move only as dictated by the wall stability control(s) and profiled inverting piston(s) shaped as a male mould member and thereby never exceed the materials elastic limit. Thus, damage-free wall inversion can be achieved.

The profiled inversion piston shaped as a male mould member with an outer surface configuration that defines the inner surface configuration of the article being formed may incorporate any one or more means of ejection and/or any one or more means of cooling known to those versed in the art.

When means of profiled inversion piston ejection are applied, an inverted second container stability device may be engaged in order to provide inverted second container stability during ejection.

Due to the combination of the mechanical stretch-phase prior to the blow-phase having an LS substantially greater than 1, the tubular blank having an RSmax substantially 3 or less, and the second smaller container inversion being assisted by the wall stability device(s) and the profiled inversion piston(s), an integral double-walled container which has the structure of two integrally connected and adjacent containers extending in the same direction with an air gap between them may be formed as a single body suitable for mass-production. The air gap so formed may be a partially sealed or an open air gap.

Additional production steps may be added at any sequence point, including but not limited to:

The use of the wall stability device(s) and the profiled inversion piston(s) to stretchingly extend side-wall length of the inverted second smaller container, Cutting away any part or parts of either integrally connected container and/or the tubular blank by any method and for any reason, Converting any partially enclosed bottom wall into a fully enclosed bottom wall by any method and may result in a fully enclosed air gap being formed, Further inverting any features or wall sections in either integrally connected container by any method and for any reason and may result in a partially or fully enclosed air gap being formed, Adding an additional part or parts of any shape or form to either integrally connected container by any method and for any reason and may result in a partially or fully enclosed air gap being formed, Adding additional material or materials of any form, property or nature into the air gap by any method and for any reason including heat-insulation improvement and/or as part of user interactive features, The application of additional shaping/forming methods to ensure that the inverted second smaller container fully assumes its final design shape/form, Printing onto any surface of either integrally connected container by any method.

Where reference has been made to methods and/or apparatus as part of the formation of a double-walled container with the structure of two integrally connected and adjacent containers extending in the same direction with an air gap between them and formed as a single body from a tubular blank with only one open end, they may equally be part of the methods and/or apparatus in the formation of a double-walled container with the structure of two integrally connected and adjacent containers extending in the same direction with an air gap between them and formed as a single body from a tubular blank with a first and second open end, and vice versa.

Where reference has been made to a method and apparatus that at least substantially inverts the second smaller container and does not invert the first container, equally a method and apparatus may at least substantially invert the first container and may not invert the second smaller container.

Where reference has been made to a method and apparatus wherein the second container is smaller than the first container, equally a method and apparatus may have a first container that is smaller than the second container.

Further aspects of the invention, which should be considered in all its novel aspects, will become apparent from the following description, which is given by way of example only.

BRIEF DESCRIPTION OF DRAWINGS

Examples of the invention will become apparent from the following description which is given by way of example with reference to the accompanying drawings which.

DETAILED DESCRIPTION

Figure 1:
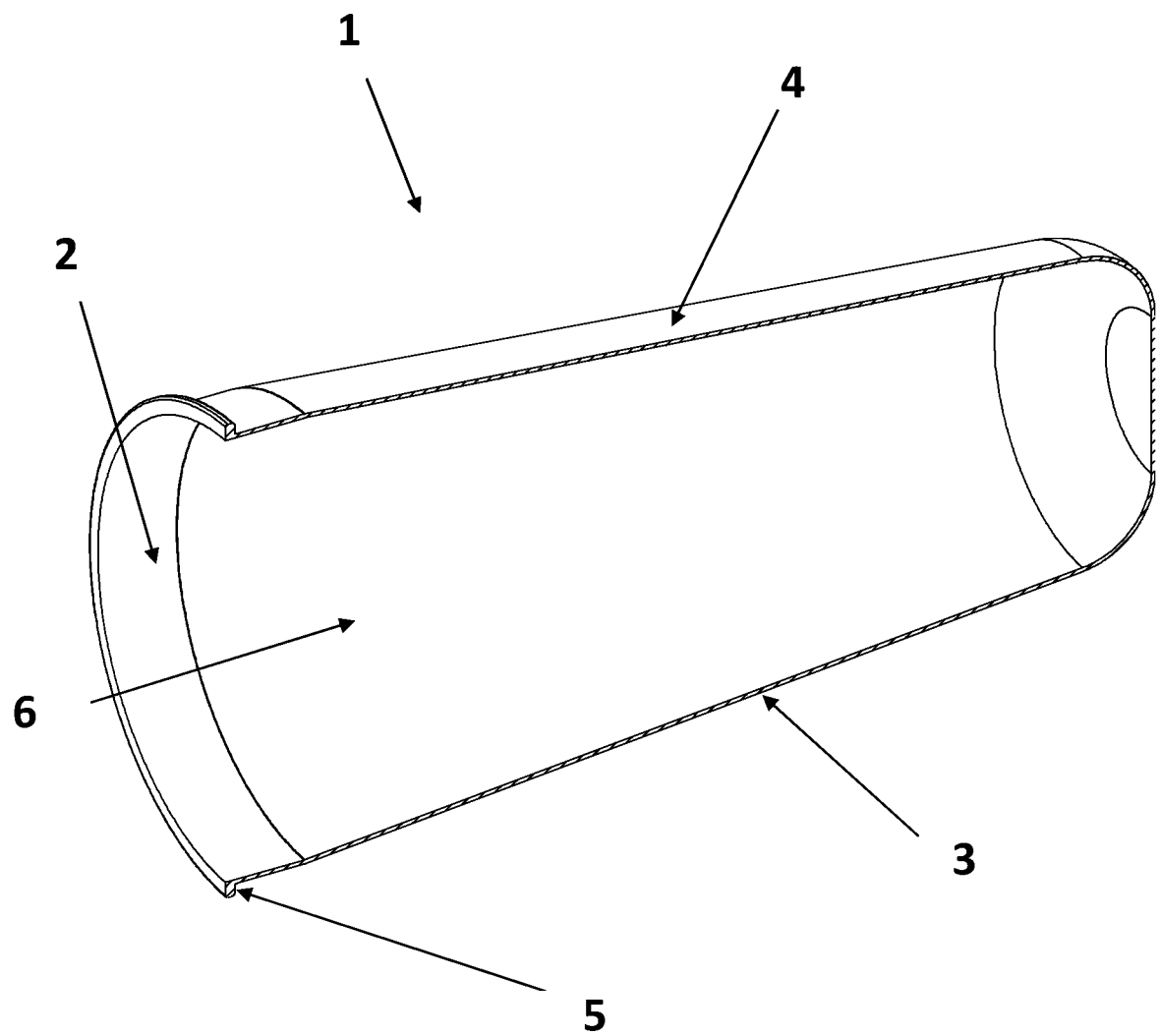
FIG. 1 shows a three-dimensional cross-section view of a thermoplastic resin tubular blank according to a first preferred embodiment of the present invention.

It will be appreciated that terminology such as "upwards", "downwards", "forwards", "backwards" etc. as used in this specification refer to the orientations shown in the drawings and orientations obvious to those versed in the art. The terms are used to indicate relative orientations, but should not be considered to be otherwise limiting.

Referring to FIG. 1, an enclosed thermoplastic resin tubular blank is depicted in three-dimensional cross-section view according to a first preferred embodiment of the present invention.

According to the first preferred embodiment of the present invention, an enclosed tubular blank 1 may have only one open end 2, and may be optimised by design such that its RSmax is substantially 3 or less in order to minimise the wall thickness 3 of the enclosed tubular blank 1 as well as to minimise the wall thickness of the integral dual-container to be stretch-blow moulded (not depicted).

As heat-conditioned tubular blanks are stretched by mechanical and/or gas pressure in order to stretchingly conform them to dual-container shaped mould cavity sets, at one or more locations tubular blanks must be;
  Mechanically clamped sufficiently to enable them to be stretched, and
  Sealingly clamped sufficiently such that pressure may be applied into their interior.

It is typical that the open end 2 of an enclosed tubular blank 1 be substantially round (as depicted) as this provides the most secure and efficient manner of mechanical and sealing attachment. However, other than at the one open end 2, the circumferential shape 4 may be any combination of geometric and/or non-geometric forms, or any change or changes in circumference, as intended by design and relative to tubular blank expansion according to the final double-walled container shape to be formed.

For an enclosed tubular blank 1, mechanical clamping may be effected at the one open end 2. Mechanical clamping may be in the form of one or more integral mechanical clamping features 5 at the one open end 2 which engagingly interconnect with external mechanical vice or clamp style arrangements in a dual-container shaped mould cavity arrangement (not depicted). Such rim shaped mechanical clamping features 5 may subsequently form the partially enclosed bottom wall of a stretch-blow moulded first container (not depicted).

For an enclosed tubular blank 1, sealing clamping may also be effected at the one open end 2 in order for gas pressure to have at least a substantially sealed pathway 6 into its interior and which engagingly interconnects with external sealing style arrangements in a dual-container shaped mould cavity arrangement (not depicted). Sealing clamping is typically incorporated as part of mechanical clamping features 5 at the one open end 2, and may include any combination of common and/or additional integral features in order to assist with sealing.

The preferred thermoplastic resin for an enclosed tubular blank 1 is polypropylene (PP), however any suitable thermoplastic resin may equally be used. A thermoplastic resin may be oil based or bio-based, clear/transparent, semi-transparent or opaque, of its natural resin colour or of any colour or combination of colours, of a single resin type or of a combination of resin types, or any combination thereof.

Figure 2:
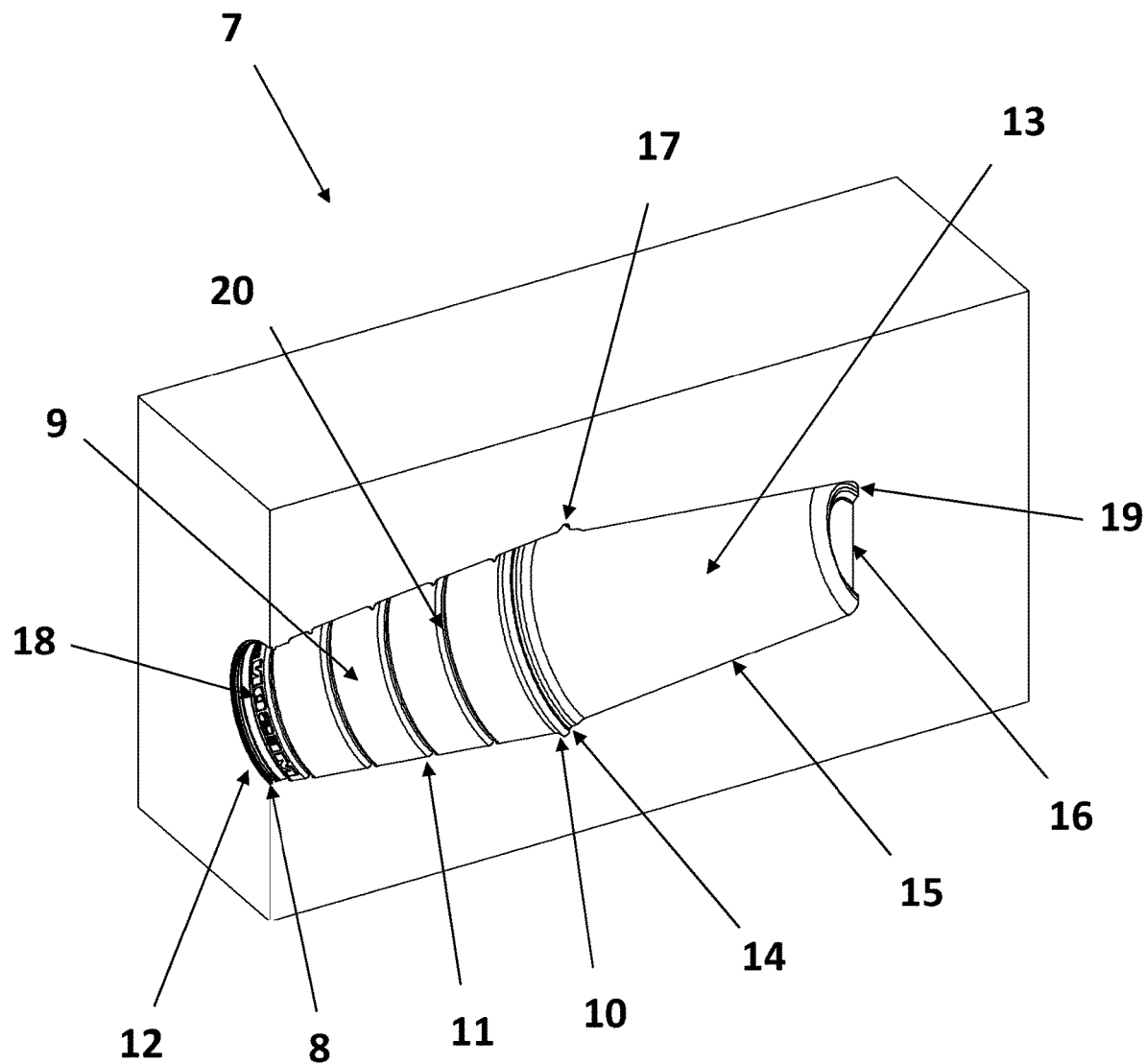
FIG. 2 shows a three-dimensional view of at least part of a first dual-container shaped mould cavity set according to the same first preferred embodiment of the present invention.

Referring to FIG. 2, at least part of a first dual-container shaped mould cavity set is depicted in three-dimensional view according to the same first preferred embodiment of the present invention.

According to the first preferred embodiment of the present invention, at least part of a first dual-container shaped mould cavity set 7 typically includes integral and interconnected cavity recesses that include but are by no means limited to:
  A large-aperture recess for mechanical and/or sealing engaging-connection 8 to the one open end 2 of a tubular blank 1 (not depicted),
  An engagingly connected first container cavity recess 9 including a mouth opening zone 10, side wall zone(s) 11 and a partially enclosed bottom wall zone 12 that may all include small-radius cavity wall features for any purpose, and where at the very least a partially enclosed bottom wall may be the mechanical and/or sealing engaging-connection features 8 at the end of the side wall(s) 11,
  An engagingly connected second smaller container cavity recess 13 including a mouth opening zone 14, side wall zone(s) 15 and a fully enclosed bottom wall zone 16 that may all include small-radius cavity wall features for any purpose,
  With the first 9 and second smaller container 13 cavity recesses extending in opposite directions from each other and integrally connected 17.

Examples of complex small-radius mould cavity wall features include, but are by no means limited to:
  Any form of logo, graphics design, lettering, promotional information or the like 18 as part of a cavity wall,
  Any geometric or non-geometric shape or form as part of a cavity wall (not depicted),
  Any abrupt changes in cavity wall height 19 typified by a ridge being formed,
  Any abrupt changes in cavity wall height that equally abruptly returns to substantially the original cavity wall height in the same plane 20 typified by a cavity rib or cavity channel,
  A raised or recessed thread form of any type as part of a cavity wall (not depicted),
  Any combination thereof, or
  A complex geometric cavity wall feature in the form of an abrupt/small-radius change readily apparent to those versed in the art.

Figure 3:
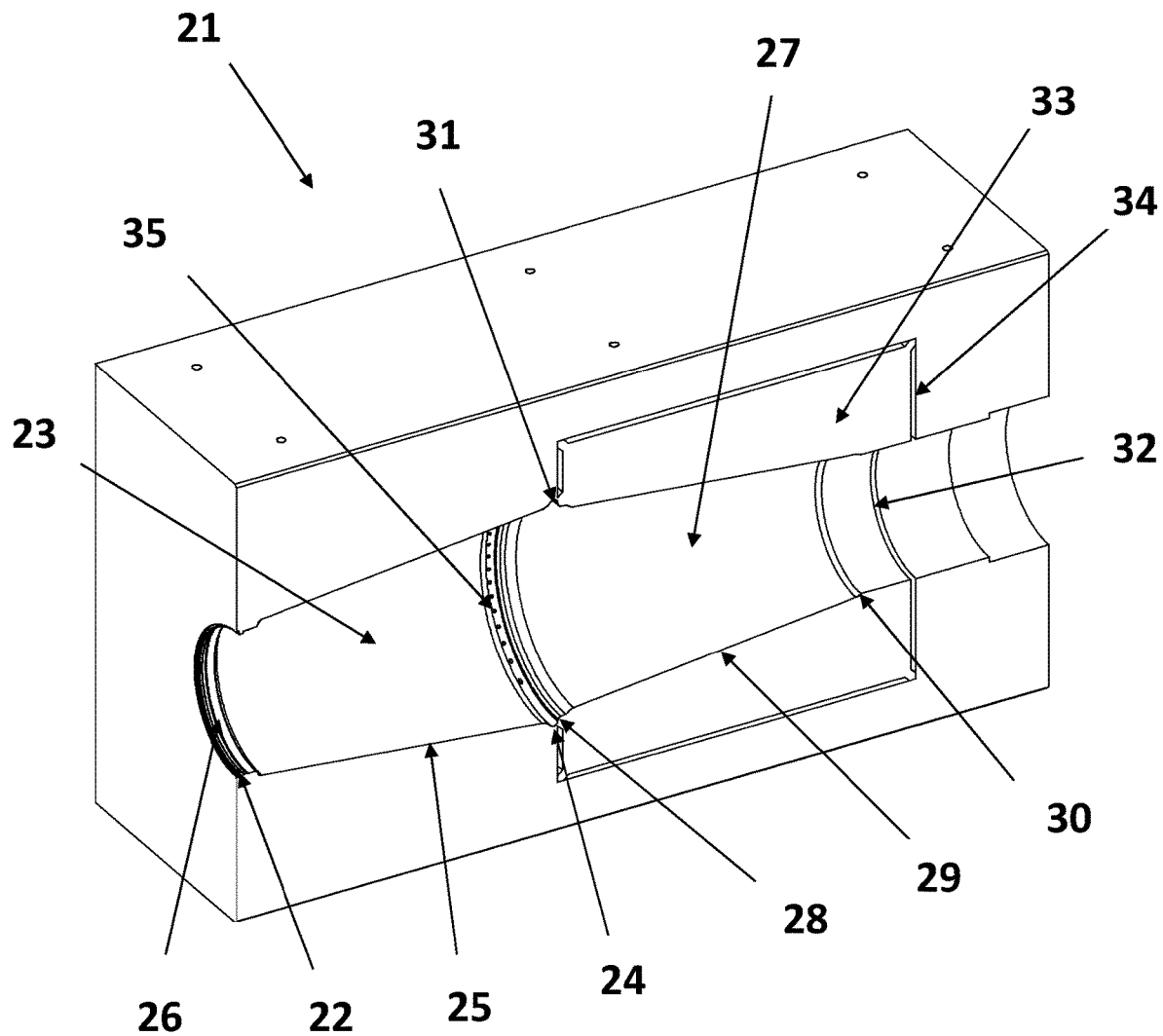
FIG. 3 shows a three-dimensional view of at least part of a second dual-container shaped mould cavity set according to any preferred embodiment of the present invention.

Referring to FIG. 3, at least part of a second dual-container shaped mould cavity set is depicted in three-dimensional view according to any preferred embodiment of the present invention.

According to any preferred embodiment of the present invention, at least part of a second dual-container shaped mould cavity set 21 typically includes integral and interconnected cavity recesses that include but are by no means limited to:
  A large-aperture recess for mechanical and/or sealing engaging-connection 22 to the partially enclosed bottom wall of a stretch-blow moulded first container (not depicted),
  An engagingly connected stretch-blow moulded first container cavity recess 23 including a mouth opening zone 24, side wall zone(s) 25 and a partially enclosed bottom wall zone 26 that may all include small-radius cavity wall features for any purpose, and where at the very least a partially enclosed bottom wall may be the mechanical and/or sealing engaging-connection features 22 at the end of the side wall(s) 25, An engagingly connected stretch-blow moulded second smaller container cavity recess 27 including a mouth opening zone 28, side wall zone(s) 29 and at least part of a partially or fully enclosed bottom wall zone 30 that may all include small-radius cavity wall features for any purpose, With the stretch-blow moulded first container 23 and stretch-blow moulded second smaller container 27 cavity recesses extending in opposite directions from each other and integrally connected 31, And at least one engagingly connected profiled inversion piston recess 32 as part of the bottom wall 30 of the stretch-blow moulded second smaller container 27, And may further include, At least one stretch-blow moulded first container 23 and/or stretch-blow moulded second smaller container 27 heat-conditioning device, as depicted in the form of at least one separate heater insert 33 with an air gap 34 between heated and unheated areas such that the cavity heater insert 33 zone(s) may be heated by any known method, and/or parts of the cavity may remain unheated as desired, and At least one pathway 35 for interconnection with at least one below atmospheric air pressure source (not depicted).

Figure 4:
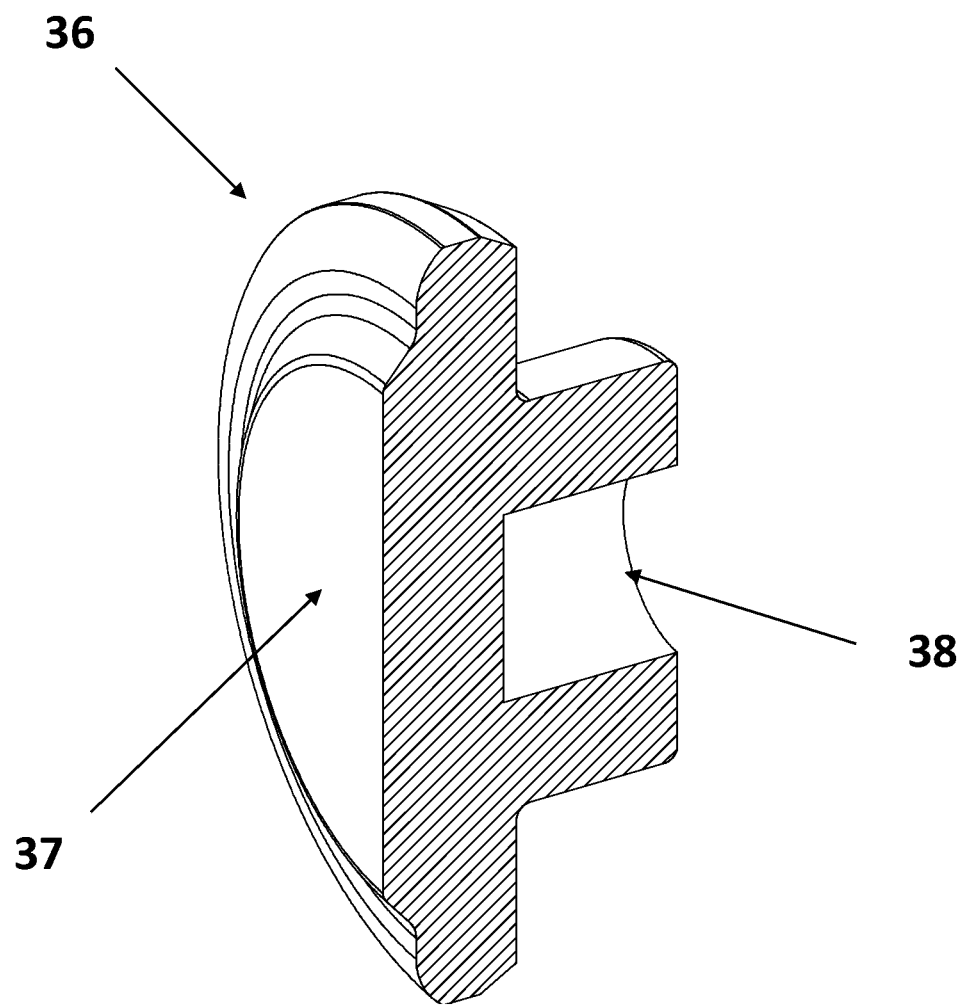
FIG. 4 shows a three-dimensional cross-section view of a profiled inversion piston according to any preferred embodiment of the present invention.

Referring to FIG. 4, a profiled inversion piston is depicted in three-dimensional cross-section view according to any preferred embodiment of the present invention.

According to any preferred embodiment of the present invention, a profiled inversion piston 36 may have any shape/form necessary to aid inversion, ranging from a flat pushing face (not depicted) through to a fully profiled shape that conforms to the final interior inverted bottom wall shape 37 to thereby ensure that a stretch-blow moulded second smaller container bottom wall at least substantially does not invert (not depicted). The preferred profile is a fully profiled shape that conforms to the final interior inverted bottom wall shape 37 and sufficiently supports a stretch-blow moulded second smaller container bottom wall during the inversion process.

As depicted, the profiled inversion piston 36 may have a recessed thread 38 as one possible way of attaching a profiled inversion piston 36 to a wall inverting drive mechanism (not depicted). There may be any number of profiled inversion pistons 36 of any one or more different shape/form in a production sequence. Preferable for overall simplicity and efficiently, there is only one profiled inversion piston 36.

Wall stability control devices within a second dual-container shaped mould cavity set include, but are not limited to:

Applying lower than atmospheric air pressure via a second dual-container shaped mould cavity set to any one or more exterior stretch-blow moulded container wall surfaces in the region or regions required for wall stability control, as depicted in FIG. 3 by the at least one pathway 35 for interconnection with at least one below atmospheric air pressure source, Appling a higher than atmospheric air pressure interior to a second dual-container shaped mould cavity set in order to provide a higher than atmospheric air pressure interior to stretch-blow moulded containers during inversion (not depicted), Using at least one of the mechanical and/or sealing engaging-connection feature 22 apertures in a second dual-container shaped mould cavity set 21 for the insertion of at least one flexible wall surface support structure interior to a second dual-container shaped mould cavity set in order to provide mechanical wall stability against relevant interior stretch-blow moulded container wall surfaces and/or to provide at least one head-shape so shaped/formed in order to assist with the formation of the final inversion shape/form desired at the point of intersection of inverting and non-inverting walls (not depicted), Any combination thereof, or Any other second dual-container shaped mould cavity set wall stability control apparent to those versed in the art.

Figure 5:
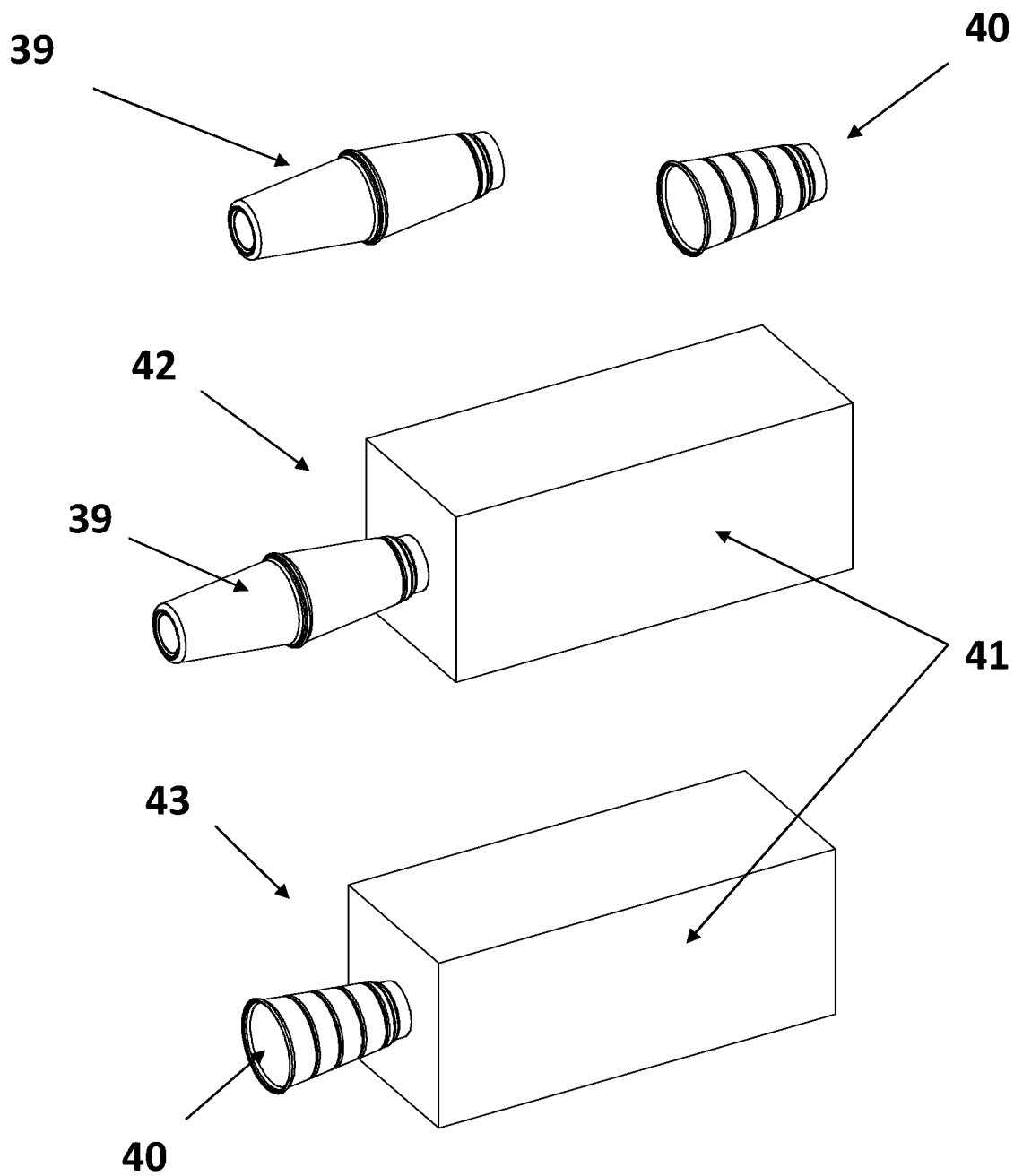
FIG. 5 shows three-dimensional views of alternate internal volume configurations as part of higher than atmospheric air pressure interior wall stability control according to any preferred embodiment of the present invention.

Referring to FIG. 5, alternate internal volume configurations as part of higher than atmospheric air pressure interior wall stability control are depicted in three-dimensional view according to any preferred embodiment of the present invention.

For integral double-walled container structures, the difference in internal volume between the stretch-blow moulded first container and integral second smaller container extending in opposite directions 39 (the air volume inside the two stretch-blow moulded containers) and the final integral double-walled container where the stretch-blow moulded first container and interior inverted second smaller container extend in the same direction 40 (the air gap between the two stretch-blow moulded containers) is substantial—and is typically more than a 10 times volumetric differential. Given that for high-speed production the requirement is for inversion to occur as quickly as possible, internal air pressure build-up between these two vastly different internal volumes may be difficult at best to control.

In the event that rate of change of internal air pressure may be directly controlled during inversion, this may be by fast-acting pneumatic control devices such as pressure regulators and/or relief valves (not depicted). However, where rate of change in internal air pressure exceeds the ability of fast-acting pneumatic devices to reliably control, an inversion apparatus stage may incorporate one or more separate pressure chambers 41 that engagingly interconnect with the interiors of the stretch-blow moulded first container 39 and integral second smaller container 40 such that their combined internal volumes 42 (=39+41) and 43 (=40+41) are substantially greater than the individual internal volumes of the stretch-blow moulded first container 39 and integral second smaller container 40. In this way, as the stretch-blow moulded second smaller container is inverted from the combined internal volume 42 into the combined internal volume 43, combined internal volume change due to inversion is small and thereby internal air pressure change may be minimised and readily controlled. Any combination of pneumatic control devices and/or one or more pressure chambers 41 may be used.

Figure 6:
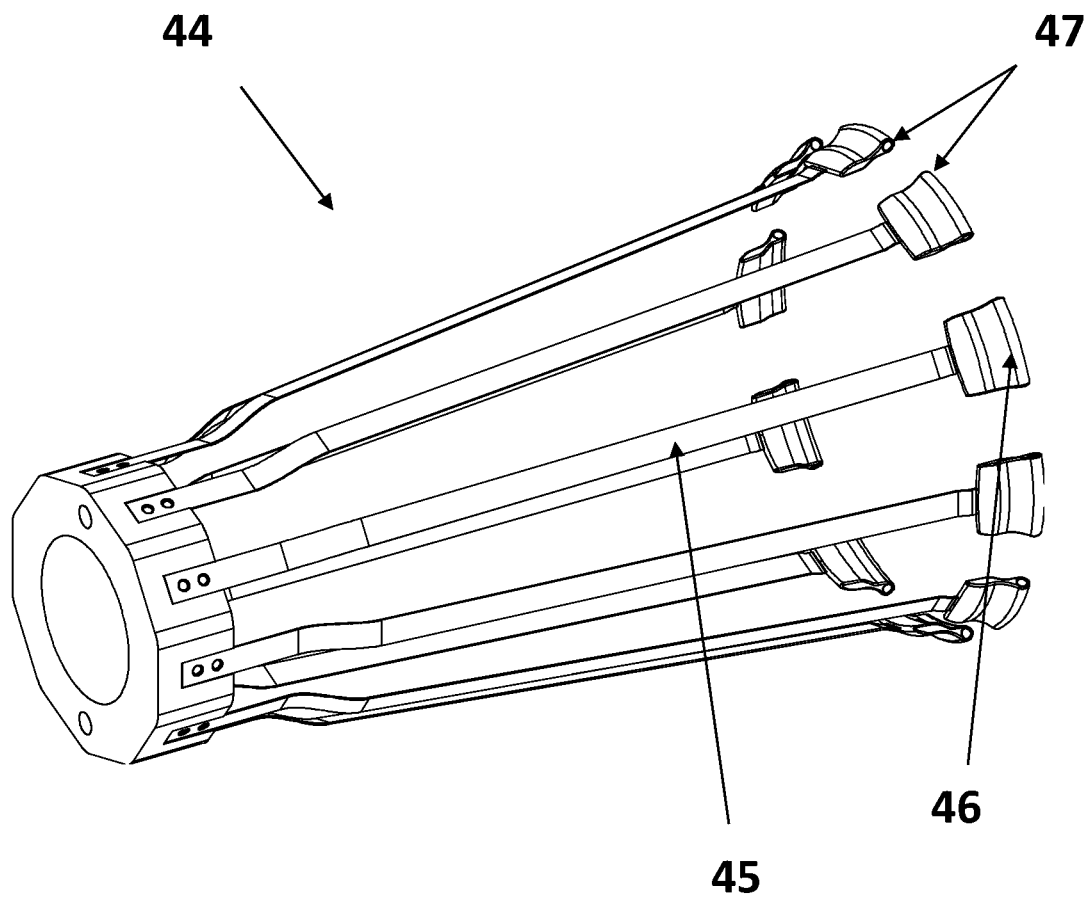
FIG. 6 shows a three-dimensional view of an interior flexible surface support structure according to any preferred embodiment of the present invention.

Referring to FIG. 6, an interior flexible surface support structure is depicted in three-dimensional view according to any preferred embodiment of the present invention.

According to any preferred embodiment of the present invention, at least one large-aperture recess for mechanical and/or sealing engaging-connection 22 in a second dual-container shaped mould cavity set 21 of FIG. 3 may be used to insert at least one interior flexible surface support structure 44 interior to a second dual-container shaped mould cavity set 21 in order to provide interior wall surface stability for any stretch-blow moulded container (not depicted) during inversion. The one or more interior flexible surface support structures 44 may be spring-loaded by any method in order to springly and engagingly contact them with relevant interior stretch-blow moulded container wall surface(s) in any internal surface region where wall surface stability is required.

As depicted, an interior flexible surface support structure 44 may have at least one spring arm 45, and any spring arm 45 may have a shaped head 46, with the head-shape so shaped/formed in order to assist with the formation of the final inversion shape/form desired at the point of intersection of inverting and non-inverting walls. Additional springs may be inserted at any position on an interior flexible surface support structure 44 (not depicted), and may advantageously be inserted between each shaped head 46 in the inter-head gap 47. The one or more interior flexible surface support structures 44 may be flexibly inserted and/or flexibly withdrawn at any point in a production sequence, whether prior to, during or following inversion.

A first step in a sequence of production of an integral double-walled container may be the formation of a tubular blank 1 of FIG. 1. Following their production, tubular blanks 1 are allowed to cool sufficiently such that they drop below their melt temperature and thereby solidify. Tubular blanks 1 may be formed integrally with or adjacent to any one or more other sequence steps, or alternately they may be formed remotely to any one or more sequence steps. The method of formation may be by any suitable process known to those versed in the art, but preferably is by either injection moulding or extrusion.

A second step in a sequence of production of an integral double-walled container may be the heat-conditioning of the tubular blank 1 to a first heat-conditioned temperature. Heat-conditioning may be by any method of heat-conditioning known to those versed in the art, and may be integral to at least one other sequence step or a separate and individual sequence step. Heat-conditioning may be an increase in temperature if by example tubular blanks 1 are formed remotely to integral double-walled container forming and thereby need to be heated upwards to heat-forming temperature, or heat-conditioning may be a decrease in temperature if by example tubular blanks 1 are formed adjacent to or integral to at least one integral double-walled container forming sequence step and thereby need to be cooled downwards to heat-forming temperature. Preferably, tubular blank 1 average heat-conditioned temperature is in the order of 80 to 100 degrees Centigrade.

Figure 7:
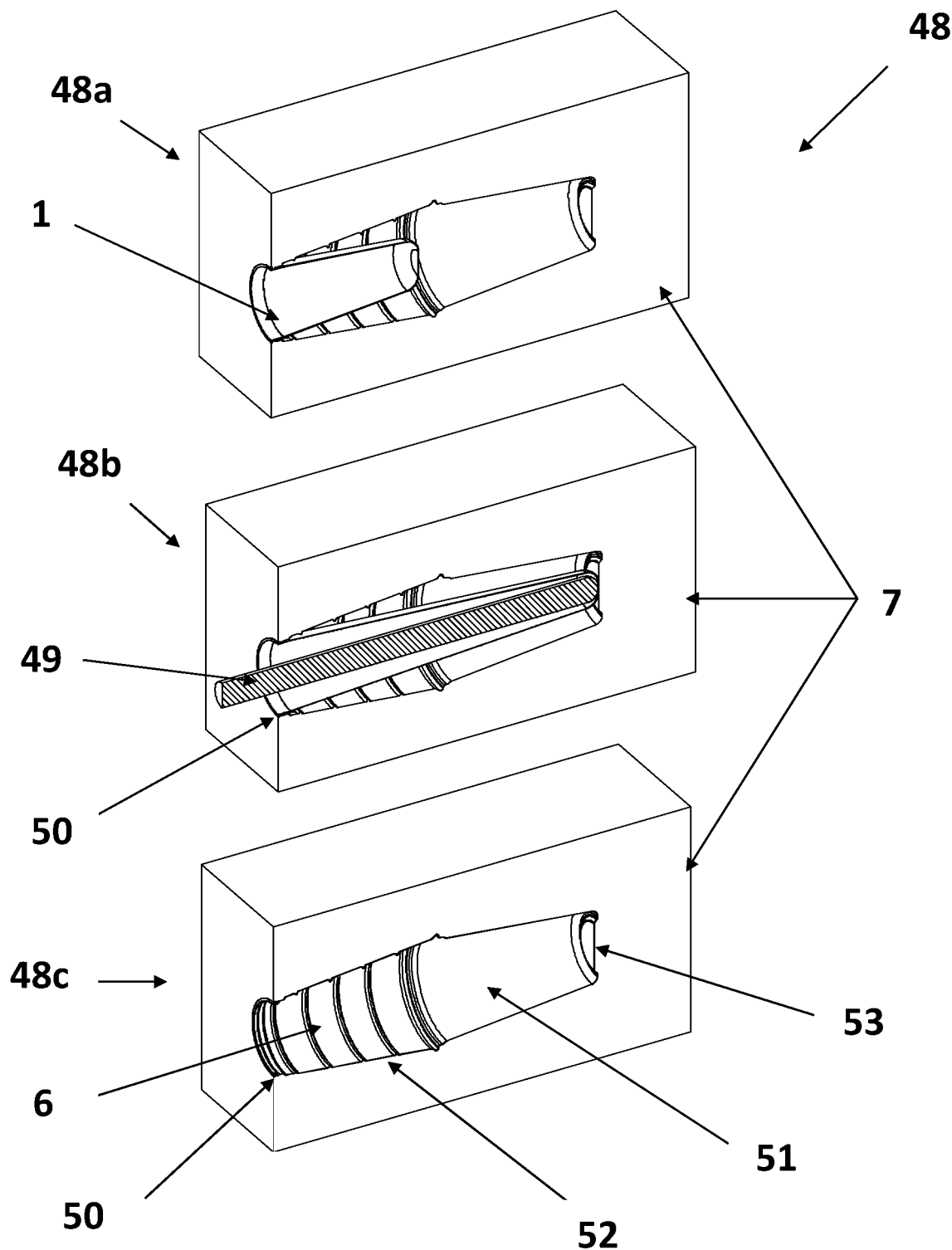
FIG. 7 shows a three-dimensional cross-section view of a stretch-blow moulding third step in a sequence of production of an integral double-walled container according to a first preferred embodiment of the present invention.

Referring to FIG. 7, a stretch-blow moulding third step in a sequence of production of an integral double-walled container is depicted in three-dimensional cross-section view according to the same first preferred embodiment of the present invention.

According to the first preferred embodiment of the present invention, a third step in a sequence of production of an integral double-walled container may be the stretch-blow moulding 48 of a heat-conditioned tubular blank 1. As depicted in 48a, the heat-conditioned tubular blank 1 is loaded into a first dual-container shaped mould cavity set 7. As depicted in 48b, a device 49 then mechanically stretches the heat-conditioned tubular blank 1, assisted by mechanical and/or sealing features 50 which may include the integral mechanical clamping features 5 of the tubular blank 1 of FIG. 1 and the mechanical and/or sealing engaging-connection 8 of the first dual-container shaped mould cavity set 7 of FIG. 2. As depicted in 48c, gas pressure (not depicted) is then applied internally to the mechanically stretched tubular blank 1 through the substantially sealed pathway 6, assisted by the mechanical and/or sealing features 50.

The combination of mechanical stretching and gas pressure stretching conforms the heat-conditioned tubular blank 1 to the shape of the first dual-container shaped mould cavity set 7 to thereby form a stretch-blow moulded integral dual-container 51 with the structure of a stretch-blow moulded first container 52 and integrally connected second smaller container 53, with the first container 52 and second smaller container 53 extending in opposite directions from each other.

The mechanically stretching of the heat-conditioned tubular blank 1 in a longitudinal axis direction has an LS greater than 1, and when combined with the blow-forming RS ratio at any point along the tubular blank, RLmax should not be substantially greater than 3 and preferably should be substantially 1 or less.

Gas pressure blow-forming may commence following completion of mechanical stretching, or gas pressure blow-forming may commence prior to completion of mechanical stretching. Heat-conditioning may occur separately from the first dual-container shaped mould cavity set 7 and/or may occur as an integral part of the first dual-container shaped mould cavity set 7 (not depicted).

Heat-conditioning, whether an increase in temperature or a decrease in temperature, may equally be applied to any one or more apparatus parts or sub-parts, such as by example only:

Applying cooling to one or more regions in a mould cavity set 7 in order to assist with returning a blow-formed integral dual-container 51 to substantially room temperature once a tubular blank 1 has conformingly and stretchingly assumed the shape of a first dual-container shaped mould cavity set 7, Applying cooling (not depicted) to a mechanical stretching device 49 in order to counteract mechanical stretch device 49 heat build-up that may lead to rupture of a thin-walled tubular blank 1 during the mechanical stretch phase 48b and/or gas pressure blow-forming phase 48c.

Figure 8:
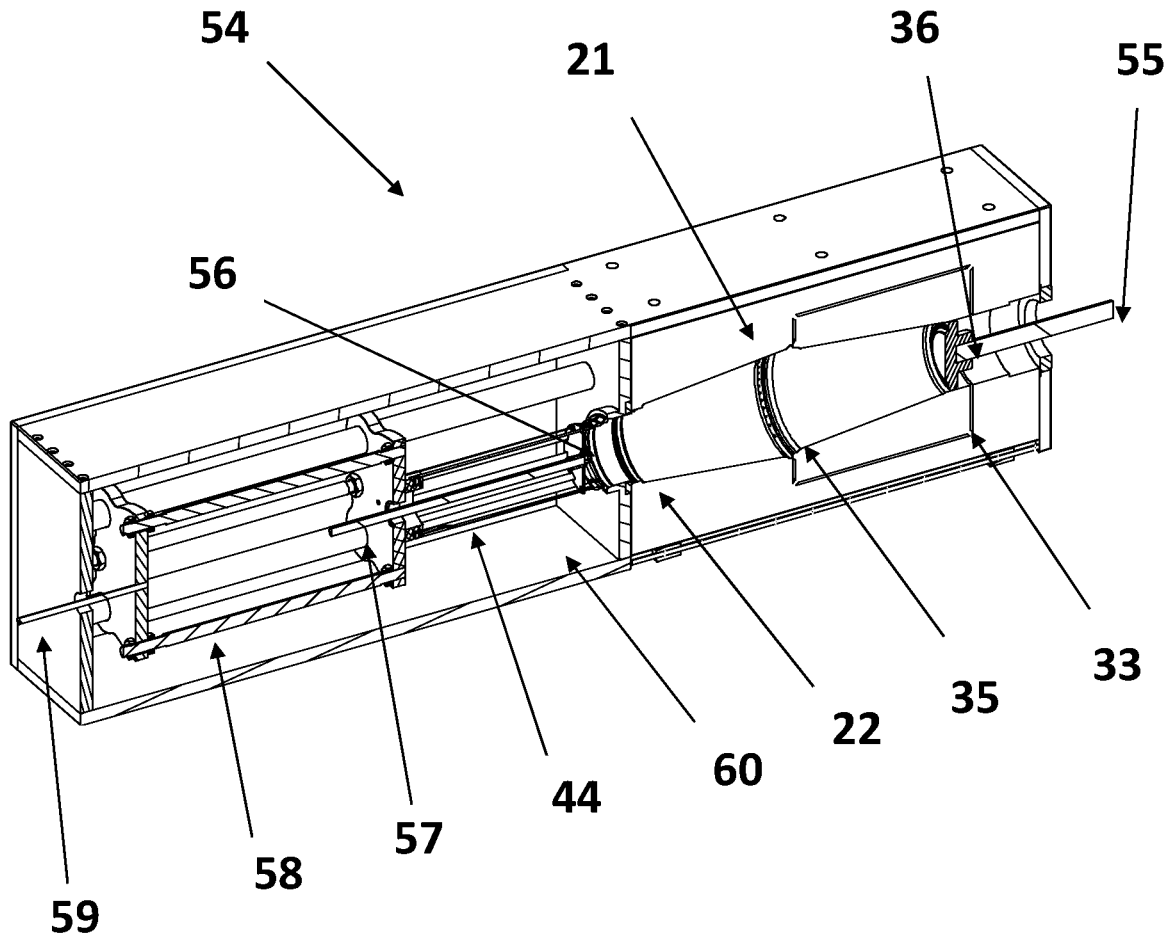
FIG. 8 shows a three-dimensional cross-section view of an inversion work station with stability control devices for stretch-blow moulded integral first and second smaller containers extending in opposite directions according to any preferred embodiment of the present invention.

Referring to FIG. 8, an inversion work station with stability control devices for stretch-blow moulded integral first and second smaller containers extending in opposite directions is depicted in three-dimensional cross-section view according to any preferred embodiment of the present invention.

According to any preferred embodiment of the present invention, an inversion work station 54 may include any one or more of the following:

A second dual-container shaped mould cavity set 21 (substantially one half of the set depicted), At least one method of stretch-blow moulded first container and/or second smaller container heating, depicted as at least one separate heater insert 33, At least one pathway 35 for interconnection with at least one below atmospheric air pressure source (not depicted), At least one profiled inversion piston 36, Method of movement 55 of the at least one profiled inversion piston 36 relative to the longitudinal axis of the second dual-container shaped mould cavity set 21, At least one interior flexible surface support structure 44, as depicted in a springly compressed state as a result of a spring-tensioner plate 56 in order to enable the interior flexible surface support structure 44 to smoothly and freely be retracted out of the interior of and/or pass into the interior of the second dual-container shaped mould cavity set 21 through the large-aperture recess for mechanical and/or sealing engaging-connection 22, Method of movement 57 of the spring-tensioner plate 56 longitudinally relative to the at least one interior flexible surface support structure 44, A structure for mounting and movement support 58 of the at least one interior flexible surface support structure 44, Method of movement 59 of the structure for mounting and movement support 58 relative to the longitudinal axis of the second dual-container shaped mould cavity set 21, At least one integral pressure chamber 60, And at least one pneumatic control device (not depicted).

Figure 9:
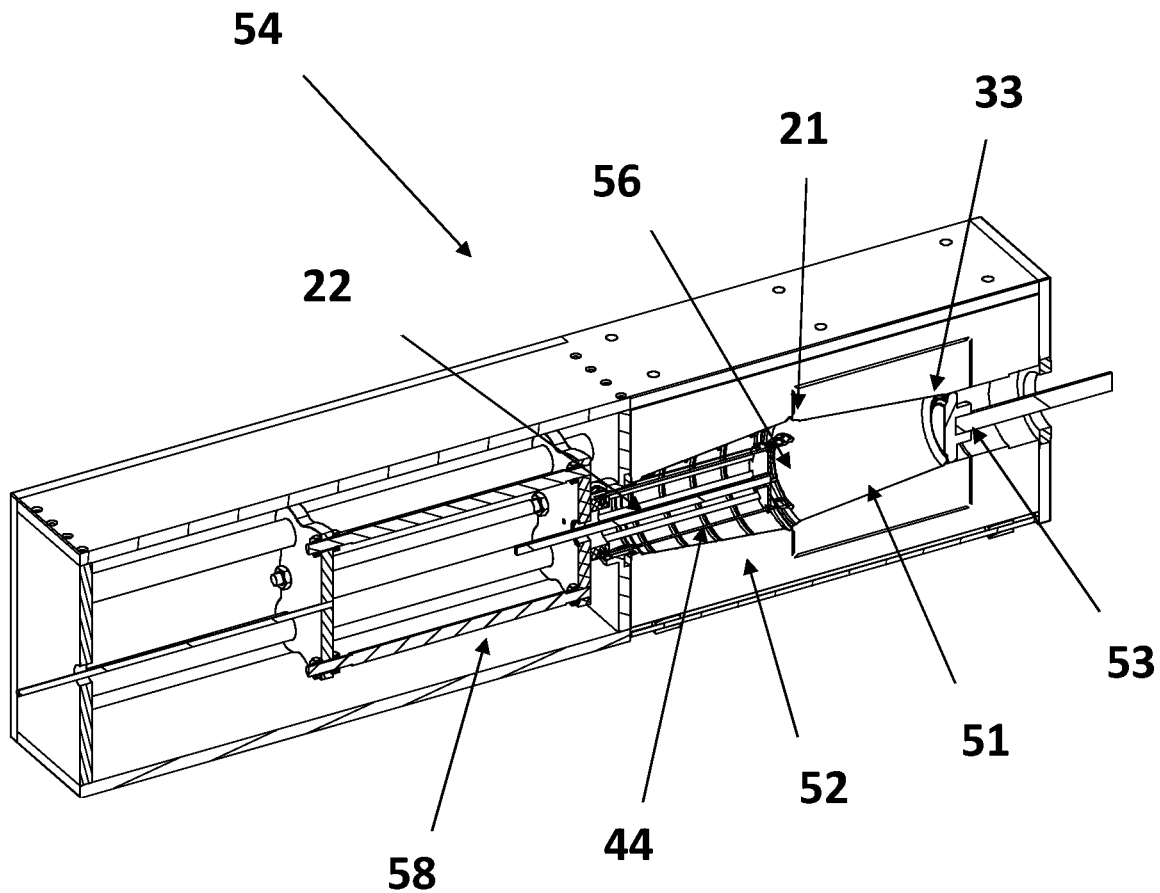
FIG. 9 shows a three-dimensional cross-section view of a first phase of a fourth inversion step in a sequence of production of an integral double-walled container according to any preferred embodiment of the present invention.

Referring to FIG. 9, a first phase of a fourth inversion step in a sequence of production of an integral double-walled container is depicted in three-dimensional cross-section view according to any preferred embodiment of the present invention.

According to any preferred embodiment of the present invention, an inversion step commences with the placement of a stretch-blow moulded integral dual-container 51 with the structure of a first container 52 and integrally connected second smaller container 53 extending in opposite directions from each other inside of the second dual-container shaped mould cavity set 21 of an inversion work station 54. The stretch-blow moulded integral dual-container 51 may be of any preferred embodiment according to the present invention.

The at least one or more parts of a stretch-blow moulded integral dual-container 51 to be inverted need to be heat conditioned to a second heat-conditioned temperature. Heat-conditioning may be effected by any method, and may occur prior to placement inside of the inversion work station 54 and/or following placement inside of the inversion work station 54. As depicted, the inversion work station 54 may include at least one heater insert 33.

The second head-conditioned temperature may be the same as or different to the first heat-conditioned temperature.

Following the placement of a stretch-blow moulded integral dual-container 51 inside of the inversion work station 54, the structure for mounting and movement support 58 may be moved longitudinally towards the second dual-container shaped mould cavity set 21, thereby moving the at least one interior flexible surface support structure 44 interior to the stretch-blow moulded integral dual-container 51. Interior insertion of the at least one interior flexible surface support structure 44 may be assisted by the spring-tensioner plate 56 springly compressing the at least one interior flexible surface support structure 44 such that it may smoothly and freely move into the interior of the stretch-blow moulded integral dual-container 51 through the large-aperture recess for mechanical and/or sealing engaging-connection 22.

Figure 10:
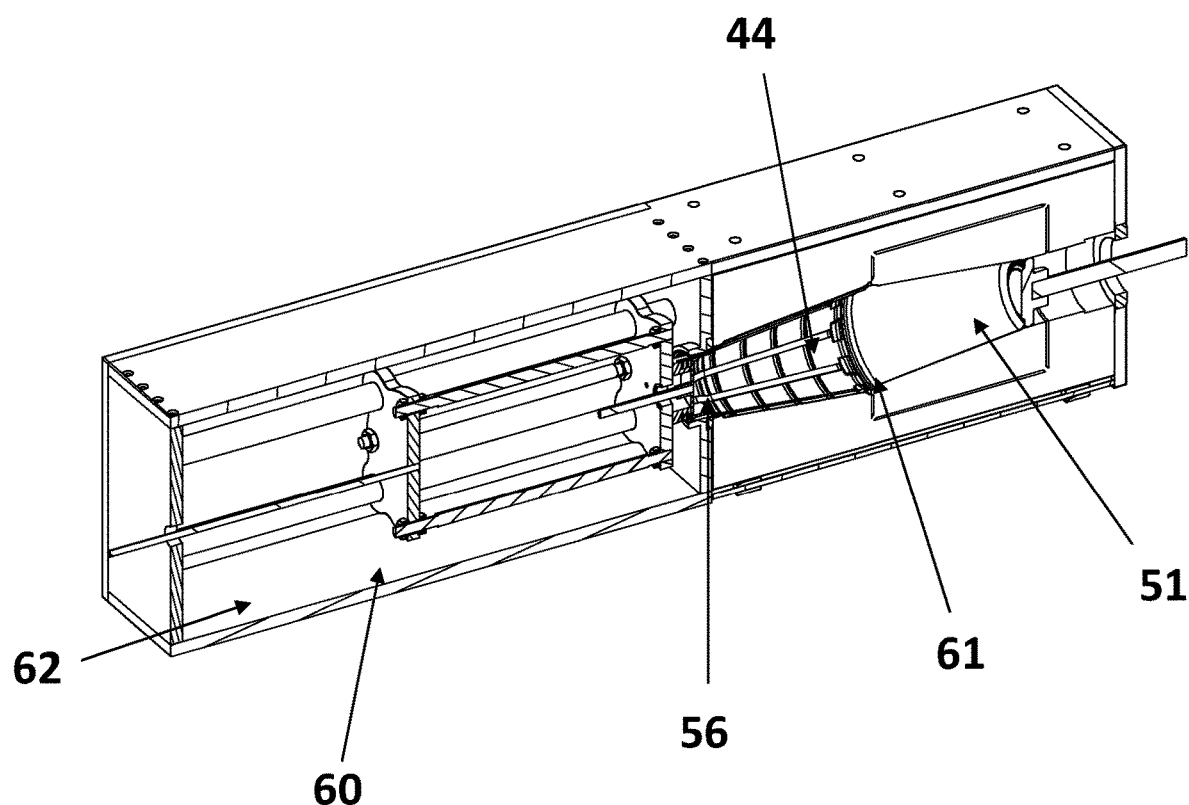
FIG. 10 shows a three-dimensional cross-section view of a second phase of the fourth inversion step of FIG. 9 according to any preferred embodiment of the present invention.

Referring to FIG. 10, a second phase of the fourth inversion step of FIG. 9 is depicted in three-dimensional cross-section view according to any preferred embodiment of the present invention.

According to any preferred embodiment of the present invention, once the at least one interior flexible surface support structure 44 has been correctly positioned interior to the stretch-blow moulded integral dual-container 51, the spring-tensioner plate 56 may be withdrawn backwards with respect to the stretch-blow moulded integral dual-container 51 such that the interior flexible surface support structure 44 may springingly flex outwards 61 to engagingly connect/contact with any one or more relevant interior surfaces of the stretch-blow moulded integral dual-container 51 that may require inversion support.

At least one pressure source (not depicted) may apply higher than atmosphere pressure 62 interior to the combined stretch-blow moulded integral dual-container 51 and pressure chamber 60.

At least one pressure source (not depicted) may apply lower than atmospheric air pressure to the exterior of the stretch-blow moulded integral dual-container 51 in any one or more relevant places (not depicted).

Figure 11:
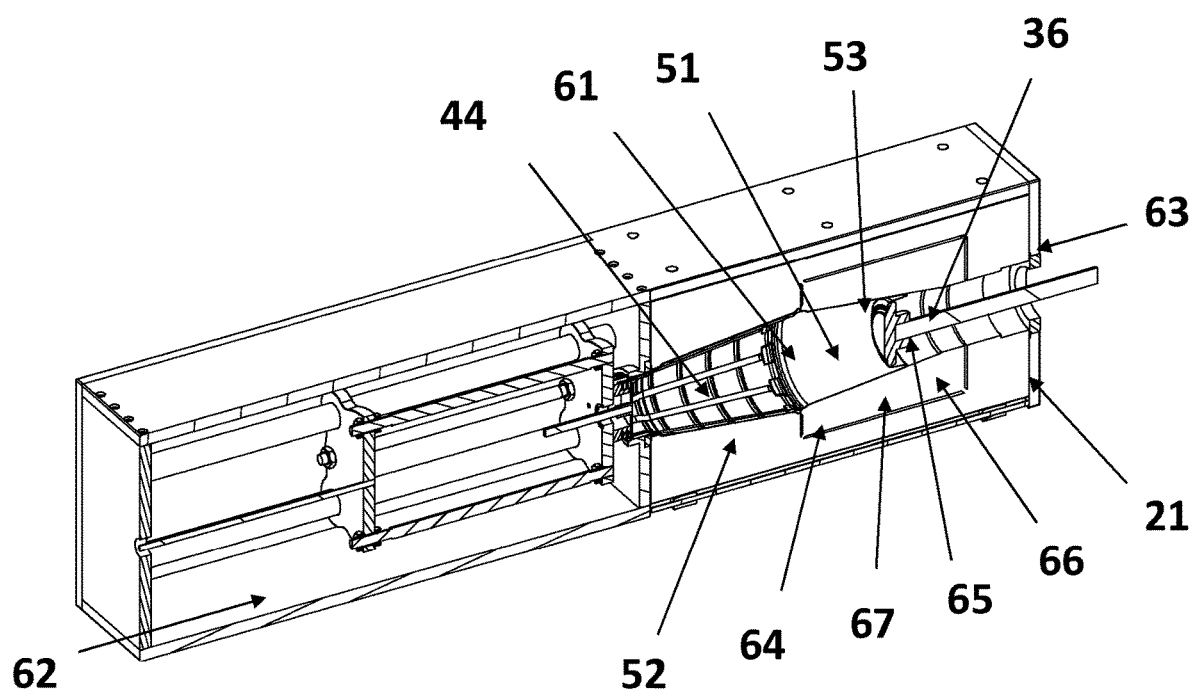
FIG. 11 shows a three-dimensional cross-section view of a third inverting phase of the fourth inversion step of FIGS. 9 and 10 according to any preferred embodiment of the present invention.

Referring to FIG. 11, a third inverting phase of the fourth inversion step of FIGS. 9 and 10 is depicted in three-dimensional cross-section view according to any preferred embodiment of the present invention.

According to any preferred embodiment of the present invention, once any one or more relevant zones of the stretch-blow moulded integral dual-container 51 have been heat-conditioned to a second heat-conditioned temperature and any one or more methods of wall stability control have been applied, at least one profiled inversion piston 36 may be moved longitudinally 63 with respect to the stretch-blow moulded integral dual-container 51 in order to commence stretch-blow moulded second smaller container 53 inversion.

In order to ensure optimal inversion of a stretch-blow moulded second smaller container 53, it is important to control wall stability in the region where inverting and non-inverting wall sections engagingly connect:

Where full inversion of a stretch-blow moulded second smaller container 53 into a full mirror-image position is desired, the region for wall stability control in a second dual-container shaped mould cavity set 21 is the connection region between the mouth opening zones 64 of the stretch-blow moulded first container 52 and second smaller container 53, Where only partial inversion of a stretch-blow moulded second smaller container 53 into a substantially mirror-image position is desired, the region for wall stability control in a second dual-container shaped mould cavity set 21 is wherever deemed necessary by design with respect to the final integral double-walled container shape being formed.

Wherever the region for wall stability control is located within a second dual-container shaped mould cavity set 21, it is important to keep the relevant stretch-blow moulded wall region(s) as physically stable as possible in order for a stretch-blow moulded second smaller container 53 to be inverted in an orderly manner, with the inversion process being to:

Begin with invertingly pushing with at least one profiled inversion piston 36 on the bottom wall 65 of a second smaller container 53 such that the bottom wall 65 remains at least substantially non-inverted and moves first in a longitudinal axis direction 63 towards the mouth opening 64, Followed by an orderly inversion of the side wall(s) 66, progressively starting from the bottom wall end of the side wall(s) heading towards the mouth opening end 64 of the side wall(s) 67, and Finally ending with the inversion of the mouth opening 64 or wherever else the inversion is intended by design to conclude.

The least one interior flexible surface support structure 44 may have at least one head-shape so shaped/formed in order to assist with the formation of the final inversion shape/form desired at the point of intersection of inverting and non-inverting walls, as by example only depicted as the mouth opening zones 64.

Any one or more methods of wall stability control may be operational at any given point within an inversion sequence, including but not limited to:

At least one interior flexible surface support structure 44 being engaged or retracted at any point in the sequence such that, as required, it is springly flexed outwards 61 to thereby engagingly connect/contact with any one or more relevant interior surfaces of the stretch-blow moulded integral dual-container 51, Above atmospheric air pressure 62 applied or disengaged at any point in the sequence, Below atmospheric air pressure (not depicted) applied or disengaged at any point in the sequence, or Any combination thereof.

Equally, inversion may occur without any method of wall stability control being applied, as by example only when inversion is undertaken manually.

Figure 12:
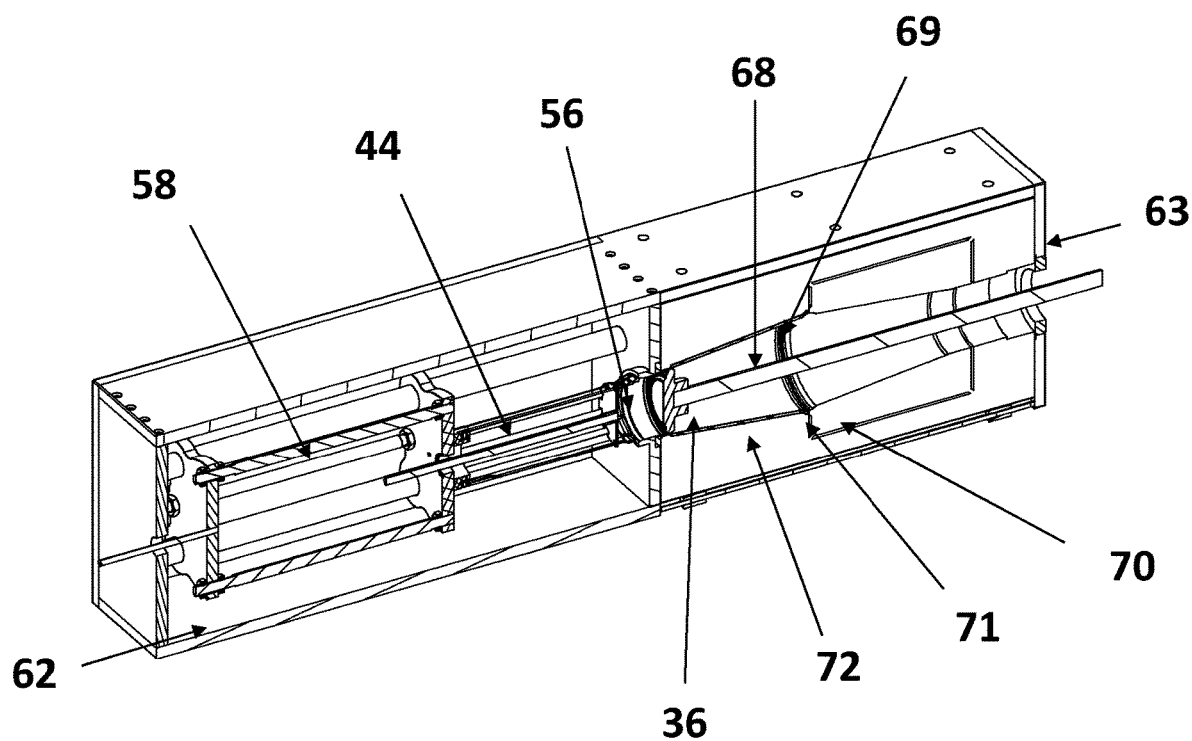
FIG. 12 shows a three-dimensional cross-section view of a final phase of the fourth inversion step of FIGS. 9 through 11 according to any preferred embodiment of the present invention.

Referring to FIG. 12, a final phase of the fourth inversion step of FIGS. 9 through 11 is depicted in three-dimensional cross-section view according to any preferred embodiment of the present invention.

According to any preferred embodiment of the present invention, inversion has been completed when the at least one profiled inversion piston 36 has reached its final design position in a longitudinal direction 63. At this point:

The at least one interior flexible surface support structure 44 may be retracted 58 and the spring-tensioner plate 56 may be moved such that it once again springly compresses the interior flexible surface support structure 44, or Prior to this retraction, the at least one interior flexible surface support structure 44 may remain engaged and the at least one profiled inversion piston 36 may continue to move further in a longitudinal direction 63 such that any inverted wall or walls may be stretchingly lengthened (not depicted).

To end the fourth inversion step:

At any point any above atmospheric air pressure 62 may be disengaged,

At any point any below atmospheric air pressure source (not depicted) may be disengaged, The at least one profiled inversion piston 36 may be retracted back to its home position (not depicted).

As a result of the combination of the mechanical stretch-phase prior to the blow-phase having an LS substantially greater than 1, the tubular blank having an RSmax substantially 3 or less, at least one dual-container shaped mould cavity set and the profiled piston(s), an integral double-walled container 68 may be formed as a single body suitable for mass-production, with the structure of a first container 69 and integrally connected 70 and at least substantially inverted second smaller container 71, and whereby the first container 69 and inverted second smaller container 71 extend in the same direction as each other thereby forming an open or at least partially sealed air gap 72 between them.

Additional production steps may be added at any sequence point, including but not limited to:

Cutting away any part or parts of either integrally connected container and/or the tubular blank by any method and for any reason, Converting any partially enclosed bottom wall into a fully enclosed bottom wall by any method, and may result in a fully enclosed air gap being formed, Further inverting any features or wall sections in either integrally connected container by any method, and for any reason and may result in a partially or fully enclosed air gap being formed, Adding an additional part or parts of any shape or form to either integrally connected container by any method and for any reason, and may result in a partially or fully enclosed air gap being formed, Adding additional material or materials of any form, property or nature into the air gap by any method and for any reason including heat-insulation improvement and/or as part of user interactive features, The application of additional shaping/forming methods to ensure that the inverted second smaller container fully assumes its final design shape/form, Printing onto any surface of either integrally connected container by any method.

In situations where mass production speeds are not required, a second smaller container may instead be manually inverted.

Figure 13:
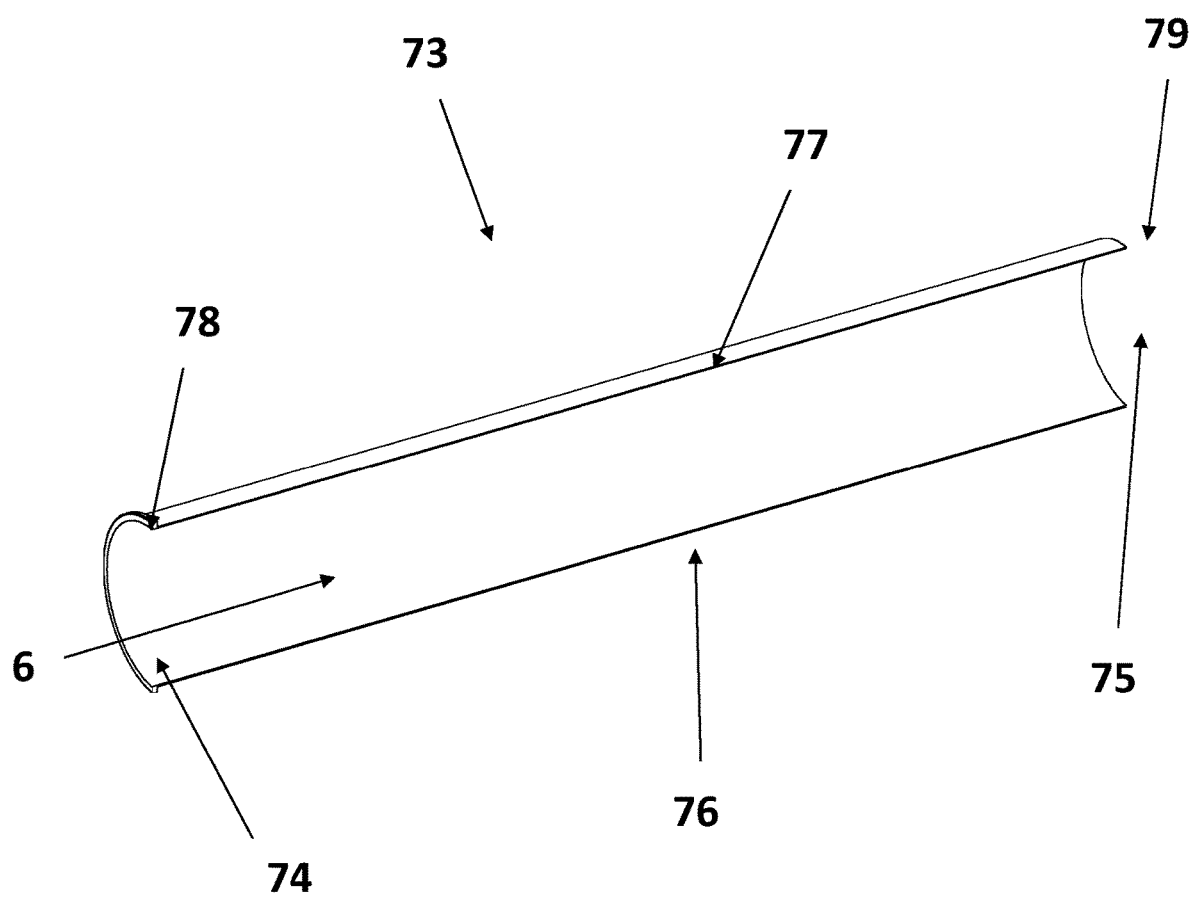
FIG. 13 shows a three-dimensional cross-section view of a thermoplastic resin tubular blank according to a second preferred embodiment of the present invention.

Referring to FIG. 13, an open thermoplastic resin tubular blank is depicted in three-dimensional cross-section view according to a second preferred embodiment of the present invention.

According to the second preferred embodiment of the present invention, an open tubular blank 73 may have a first open end 74 and a second open end 75, and may be optimised by design such that its RSmax is substantially 3 or less in order to minimise the wall thickness 76 of the open tubular blank 73 as well as to minimise the wall thickness of the integral double-walled container to be stretch-blow moulded (not depicted).

As heat-conditioned tubular blanks are stretched by mechanical and/or gas pressure in order to stretchingly conform them to dual-container shaped mould cavity sets, at one or more locations tubular blanks must be;

Mechanically clamped sufficiently to enable them to be stretched, and

Sealingly clamped sufficiently such that pressure may be applied into their interior.

It is typical that the open ends 74 and 75 of an open tubular blank 73 be substantially round (as depicted) as this provides the most secure and efficient manner of mechanical and sealing attachment. However, other than at the open ends 74 and 75, the circumferential shape 77 may be any combination of geometric and/or non-geometric forms, or any change(s) in circumference, as intended by design and relative to tubular blank expansion according to the final double-walled container shape to be formed.

For an open tubular blank 73, mechanical clamping may be effected at both ends 74 and 75. Mechanical clamping may be in the form of one or more integral mechanical clamping features 78 at either/or both open ends which engagingly interconnect with external mechanical vice or clamp style arrangements in a dual-container shaped mould cavity arrangement (not depicted). There may also be no clamping features 79 at either/or both open ends.

For an open tubular blank 73, sealing clamping may also be effected at either/or both open ends in order for gas pressure to have at least a substantially sealed pathway 6 into its interior and which engagingly interconnects with external sealing style arrangements in a dual-container shaped mould cavity arrangement (not depicted). Sealing clamping is typically incorporated as part of mechanical clamping, and may include any combination of common and/or additional integral features in order to assist with sealing.

The preferred thermoplastic resin for an open tubular blank 73 is polypropylene (PP), however any suitable thermoplastic resin may equally be used. A thermoplastic resin may be oil based or bio-based, clear/transparent, semi-transparent or opaque, of its natural resin colour or of any colour or combination of colours, of a single resin type or of a combination of resin types, or any combination thereof.

Figure 14:
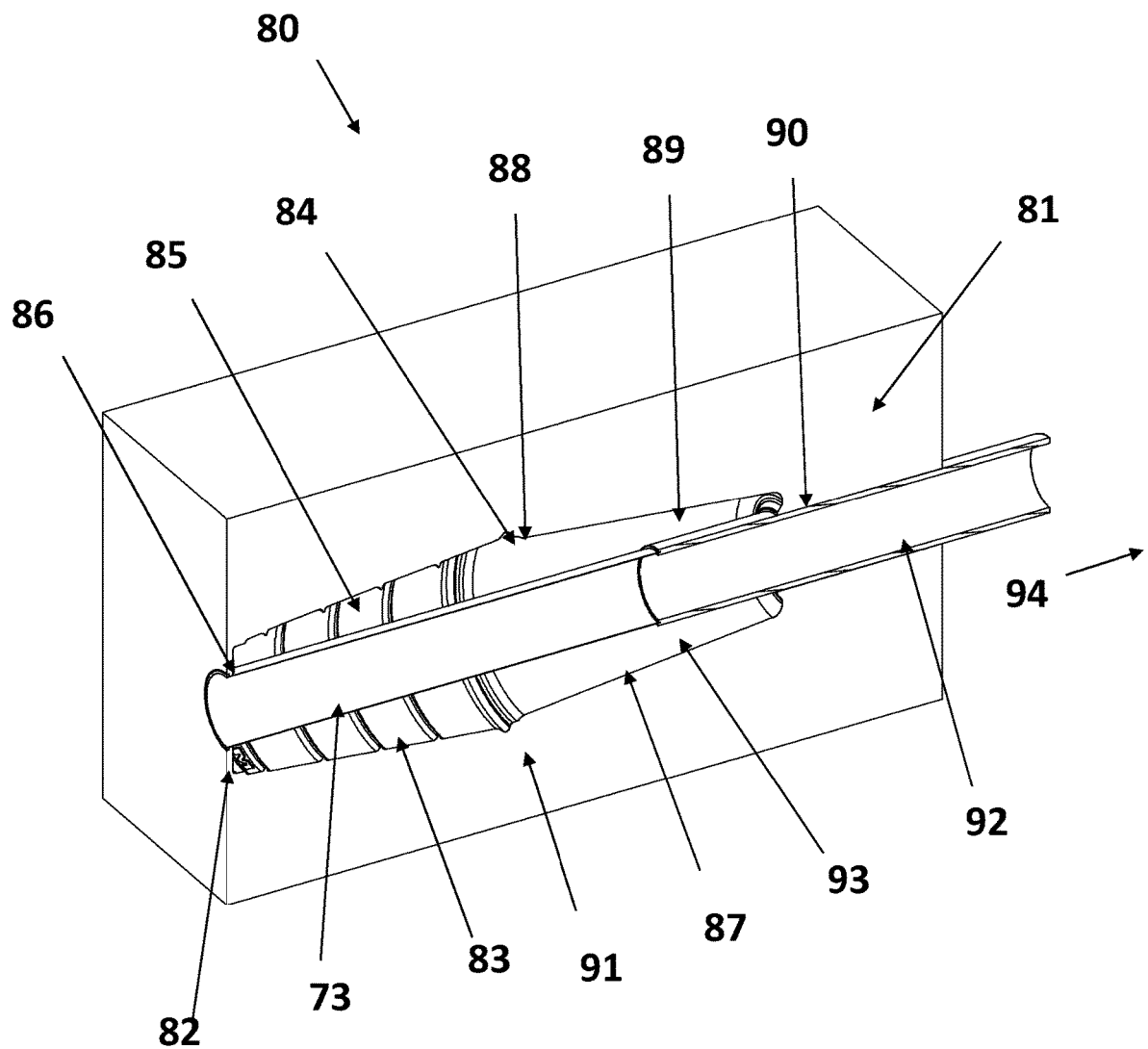
FIG. 14 shows a three-dimensional view of at least part of a first dual-container shaped mould cavity arrangement according to the same second preferred embodiment of the present invention.

Referring to FIG. 14, at least part of a first dual-container shaped mould cavity arrangement is depicted in three-dimensional view according to the same second preferred embodiment of the present invention.

According to the second preferred embodiment of the present invention, at least part of a first dual-container shaped mould cavity arrangement 80 typically includes, but is not limited to:

At least part of a first dual-container shaped mould cavity set 81 with integral and interconnected cavity recesses that include but are by no means limited to:
A large-aperture recess for mechanical and/or sealing engaging-connection 82 that may connect to at least one open end of an open tubular blank 73,
An engagingly connected first container cavity recess 83 including a mouth opening zone 84, side wall zone(s) 85 and a partially enclosed bottom wall zone 86 that may all include small-radius cavity wall features for any purpose,
An engagingly connected second smaller container cavity recess 87 including a mouth opening zone 88, side wall zone(s) 89 and a partially enclosed bottom wall zone 90 that may all include small-radius cavity wall features for any purpose,
With the first 83 and second smaller container 87 cavity recesses extending in opposite directions from each other and integrally connected 91, and
An arrangement for assisting with the mechanical stretching an open tubular blank 73 that has two open ends, as depicted in the form of an arrangement 92 that may sealingly and/or mechanically engage with at least one open end 93 of an open tubular blank 73 by any known method in order to assist with the mechanical stretching of a heat-conditioned open tubular blank in a longitudinal axis direction 94.

The process steps for forming an integral double-walled container may occur as in-line process steps, as adjacent process steps, or as remote process steps, or any combination thereof. It is preferred that the process steps occur in-line and/or adjacent to each other.

Each process step and apparatus device as taught may occur once only in a production sequence in any order, or any one or more process steps and/or apparatus device may occur multiple times, ether sequentially of non-sequentially as required in order to achieve the most efficient overall production throughput. Any one or more process steps as taught herein may be combined together or separated into sub-steps as required.

Where reference has been made to methods and/or apparatus as part of the formation of a stretch-blow moulded double-walled container with the structure of two integrally connected and adjacent containers extending in the same direction as each other and with an air gap between them and formed as a single body from a tubular blank with only one open end, they may equally be part of the methods and/or apparatus in the formation of a stretch-blow moulded double-walled container with the structure of two integrally connected and adjacent containers extending in the same direction as each other with an air gap between them and formed as a single body from a tubular blank with a first and second open end, and vice versa.

Where reference has been made to a method and apparatus that at least substantially inverts the second smaller container and does not invert the first container, equally a method and apparatus may at least substantially invert the first container and may not invert the second smaller container.

Where reference has been made to a method and apparatus wherein container inversion is as a result of mechanical devices, equally a method and apparatus may include one or more manual container inversion steps.

Figure 15:
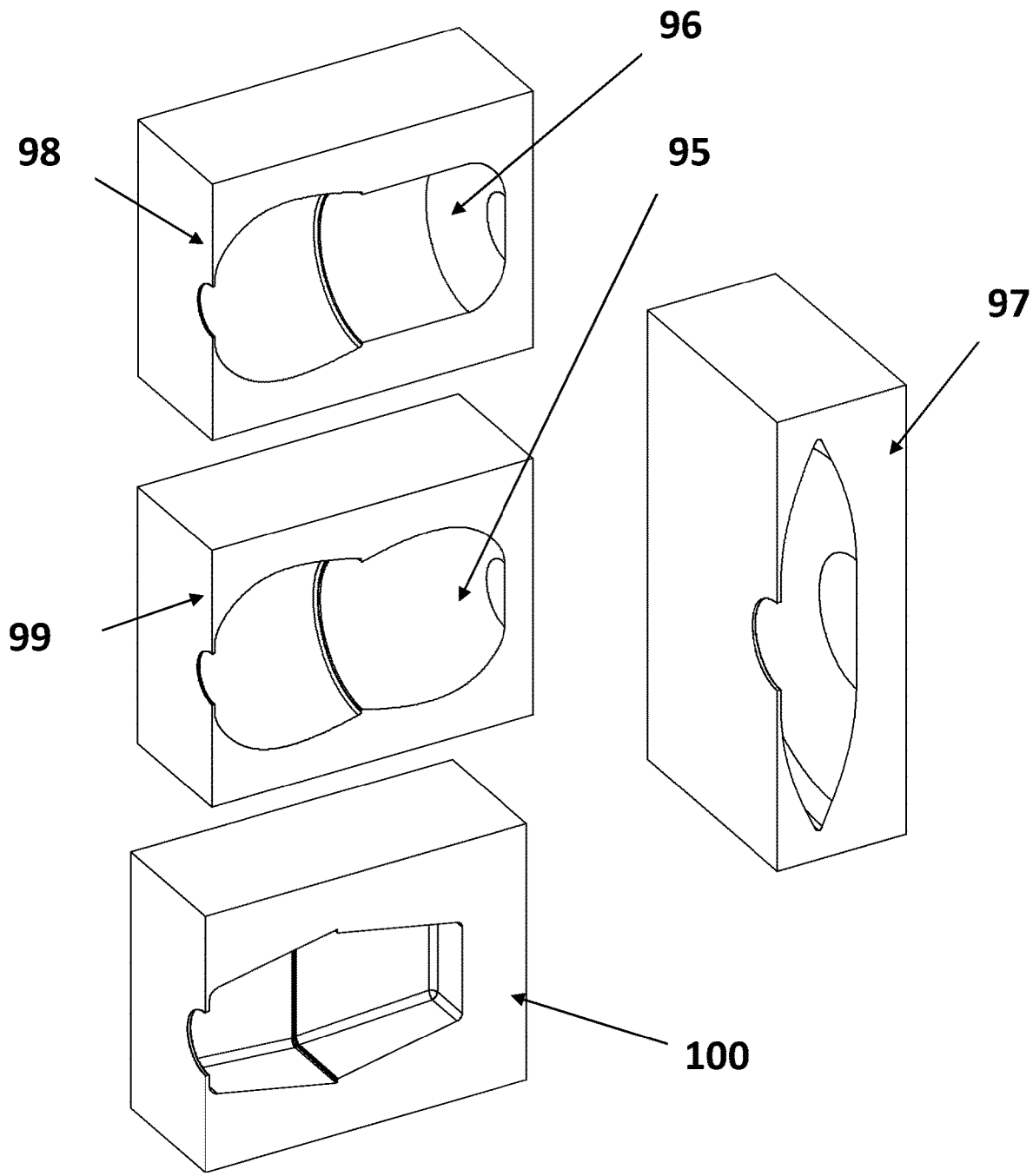
FIG. 15 shows three-dimensional cross section views of alternate dual-container shaped mould cavity configurations according to any preferred embodiment of the present invention.

Referring to FIG. 15, alternate second dual-container shaped mould cavity configurations are depicted in three-dimensional view according to any preferred embodiment of the present invention.

According to any preferred embodiment of the present invention, a second smaller container cavity recess may be slightly smaller than its respective first container cavity recess, or a second smaller container cavity recess may be substantially smaller than its respective first container cavity recess (not depicted).

A second smaller container cavity recess may have substantially the same shape/form 95 as its respective first container cavity recess, or a second smaller container cavity recess may have a substantially different or totally different shape/form 96 to its respective first container cavity recess. The mould cavity set halves in a second container-shaped mould cavity set may be exact mirror image copies of each other, or the mould cavity halves in a second container-shaped mould cavity set may be of different cavity shapes/forms to each other (not depicted).

The prime market applications for integral double-walled containers formed as a result of the method and apparatus herein taught include, but are not limited to:

As a cup for fast food and coffee retail outlets, as by example only as already depicted in the dual-container shaped mould cavity configurations of previous FIGS.,
As a plate or lid for fast food and coffee retail outlets, as by example only as depicted in the dual-container shaped mould cavity configuration 97,
As a bottle or pottle for perishable foodstuffs, pharmaceuticals, chemicals and cosmetics, as by example only as depicted in the dual-container shaped mould cavity configurations 98 and 99,
As a container for fast foods, as by example only as depicted in the dual-container shaped mould cavity configuration 100,
As a secondary packaging cup, glass, bottle, plate, lid or container for any market sector, as by example only as depicted in the dual-container shaped mould cavity configurations 97, 98, 99 and 100.

Figure 16:
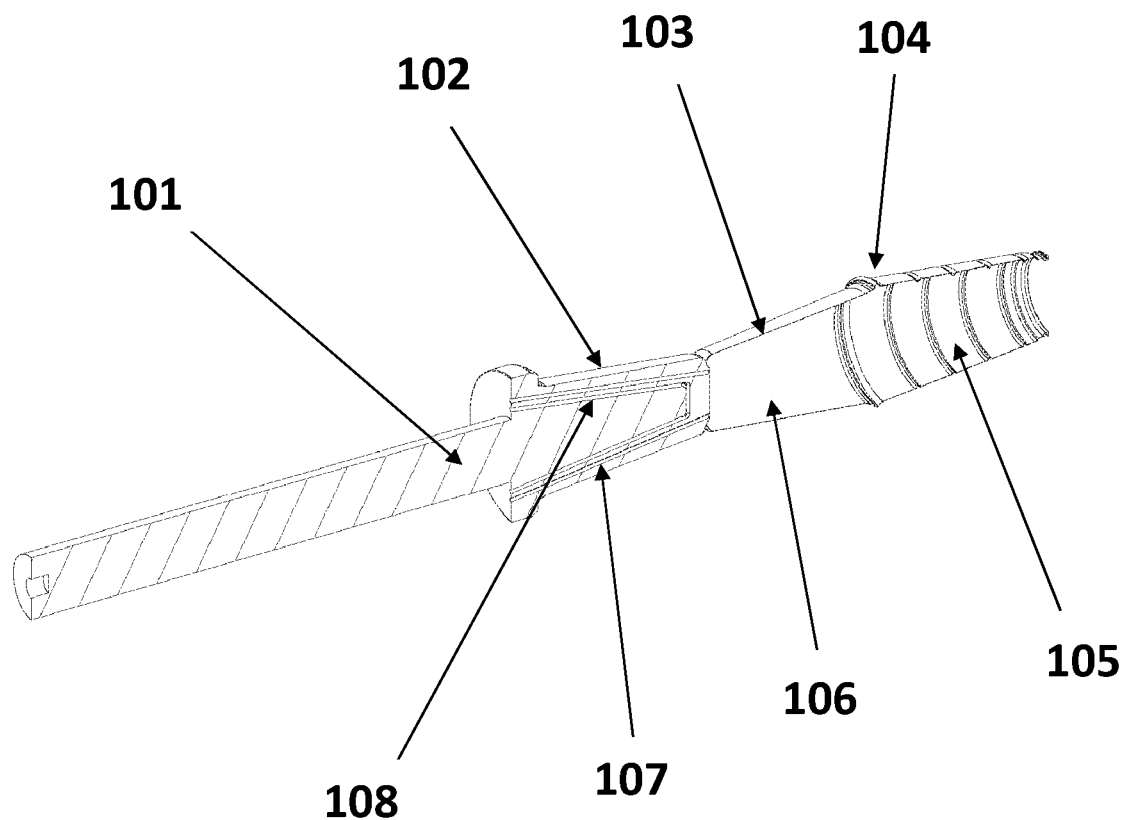
FIG. 16 shows a three-dimensional cross section view of a profiled inversion piston shaped as a male mould member with an outer surface configuration that defines the inner surface configuration of an article being formed along with an associated article to be formed according to a third preferred embodiment of the present invention.

Referring to FIG. 16, a profiled inversion piston shaped as a male mould member with an outer surface configuration that defines the inner surface configuration of an article being formed along with an associated article to be formed are depicted in three-dimensional view according to a third preferred embodiment of the present invention.

According to the third preferred embodiment of the present invention, a profiled inversion piston shaped as a male mould member 101 may have an outer surface configuration 102 that defines the inner surface configuration 103 of an article being formed 104 (as depicted, the article being formed 104 is in the form of an intermediate stretch-blow moulded integral dual-container with the structure of a first container 105 and integrally connected second container 106, with the first container 105 and second container 106 extending in opposite directions from each other and formed as a single piece).

A profiled inversion piston shaped as a male mould member 101 may incorporate:

Any one or more means of ejection 107 (as depicted, in the form of compressed air pathways), Any one or more means of heat-conditioning 108, whether internal and/or external (as depicted, in the form of internal cooling pathways).

The surface configuration 102 of a profiled inversion piston shaped as a male mould member 101 can be conical (as depicted), convex (not depicted), concave (not depicted), and/or any other configuration or combination of configurations thereof.

When a profiled inversion piston shaped as a male mould member 101 defines the inner surface 103 of an article being formed 104, once the second container 106 has been inverted, the now as-formed article at least substantially conformally engages with the profiled inversion piston shaped as a male mould member 101 (not depicted) thereby retraction of the profiled inversion piston shaped as a male mould member 101 from its position interior to the now as-formed article may require one or more means of retraction assistance. Any number of such means of retraction assistance are well known to those versed in the art and are typically referred to as "ejection mechanisms".

The preferred ejection mechanisms during retraction are compressed air applied into the conformal engagement region (as depicted, via compressed air pathways 107) and/or any form of mechanical ejection means (not depicted).

There may be a tendency for heat build-up in a profiled inversion piston shaped as a male mould member 101 as a result of it defining the inner surface of an as-formed article (not depicted) in combination with any residual heat-conditioning remaining in the as-formed article. Any one or more forms of cooling means 108 known to those versed in the art may be incorporated interior to and/or exterior to a profiled inversion piston shaped as a male mould member 101 to counteract such heat build-up (as depicted, in the form of interior cooling pathways 108).

Figure 17:
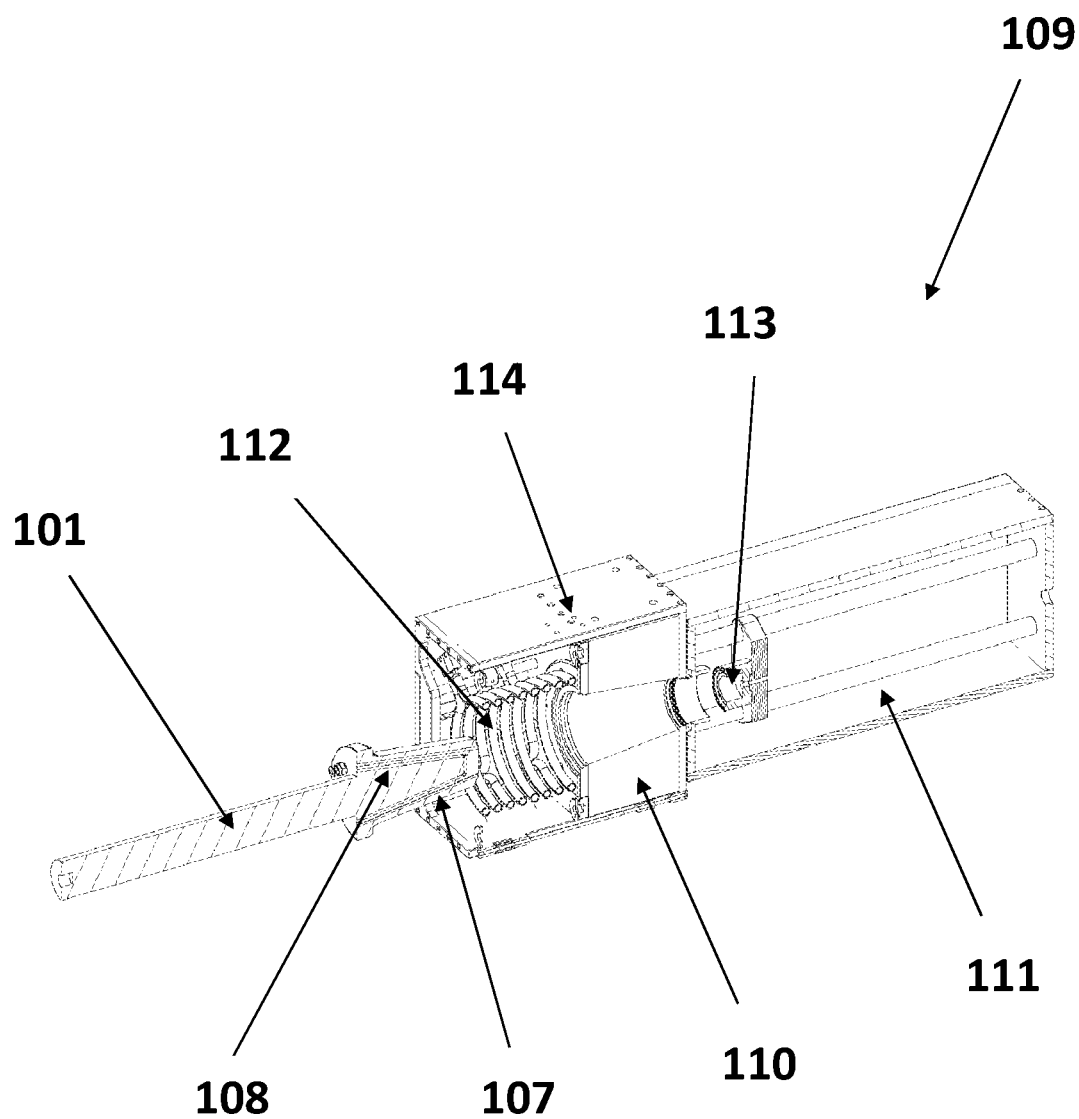
FIG. 17 shows a three-dimensional cross-section view of an inversion work station including a second container shaped mould cavity set with a single-container configuration, stability control devices, first container and/or second smaller container heat-conditioning, the profiled inversion piston shaped as a male mould member of FIG. 16, profiled inversion piston ejection means, and an inverted second container stability device according to the same third preferred embodiment of the present invention.

Referring to FIG. 17, an inversion work station including a second container shaped mould cavity set with a single-container configuration, stability control devices, second smaller container heat-conditioning, a profiled inversion piston shaped as a male mould member, profiled inversion piston ejection means, and an inverted second container stability device are depicted in three-dimensional view according to the same third preferred embodiment of the present invention.

According to the same third preferred embodiment of the present invention, an inversion work station 109 may include:

A second container shaped mould cavity set with a single-container configuration 110, Stability control devices 111 (as depicted, in the form of an above atmospheric interior air pressure system), Second smaller container heat-conditioning 112 (as depicted, in the form of an Infra-red heating system), A profiled inversion piston shaped as a male mould member 101, which may incorporate profiled inversion piston ejection means 107 and/or heat-conditioning means 108, and An inverted second container stability device 113 (as depicted, in the form of a retractable backstop mechanism).

A second container shaped mould cavity set with a single-container configuration 110 may also include access-way 114 for the likes of first container heating and/or cooling heat-conditioning and/or below atmospheric air pressure wall stability devices (not depicted).

Figure 18:
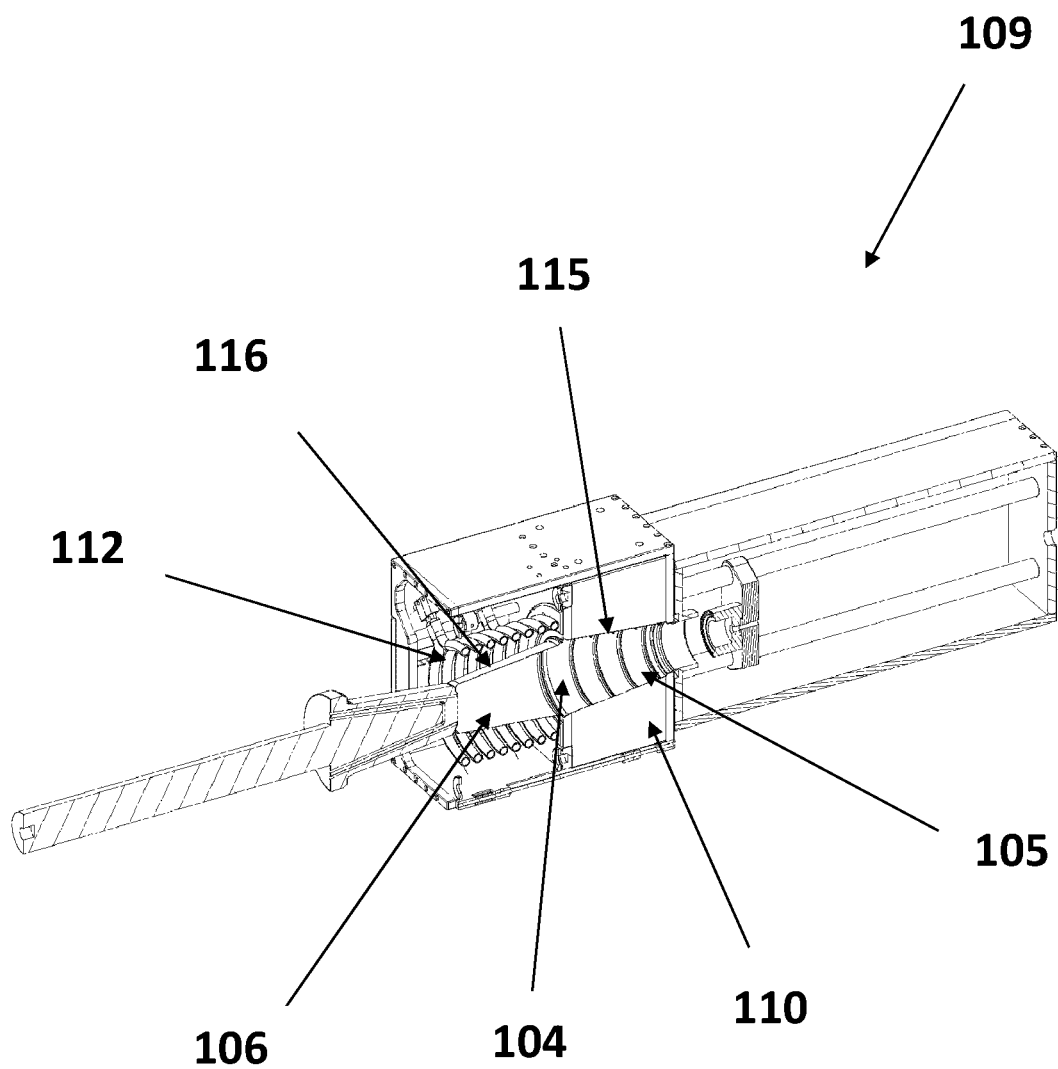
FIG. 18 shows a three-dimensional cross-section view of the inversion work station of FIG. 17 with the article to be formed of FIG. 16 inserted ready for inversion according to the same third preferred embodiment of the present invention.

Referring to FIG. 18, the inversion work station of FIG. 17 with the article to be formed of FIG. 16 inserted ready for inversion is depicted in three-dimensional view according to the same third preferred embodiment of the present invention.

According to the same third preferred embodiment of the present invention, an article to be formed 104 has been inserted ready for inversion into the inversion work station 109. Once inserted:

The first container side wall(s) 105 of an article to be formed 104 are at least substantially encased 115 in the second container shaped mould cavity set 110, and The second smaller container side wall(s) 106 of an article to be formed 104 are at least substantially not encased 116 in the second container shaped mould cavity set 110.

With the second smaller container 106 at least substantially not enclosed in the second container shaped mould cavity set 110:

Any form or combination of forms of contact and/or non-contact heating 112 can be used to heat condition the second smaller container 106, whether located interior to, exterior to (as depicted) or both interior and exterior to the second smaller container 106, Such second smaller container heat conditioning 112 may remain in effect during part of or all of the inversion process, and The use of higher than atmospheric air pressure internally and/or lower than atmospheric air pressure externally (not depicted) as means of wall stability control enables the heat-conditioned second smaller container 106 to stretchingly and elastically expand freely outwards thereby improving the ability of the second smaller container 106 to invert without sustaining wall-damage.

Figure 19:
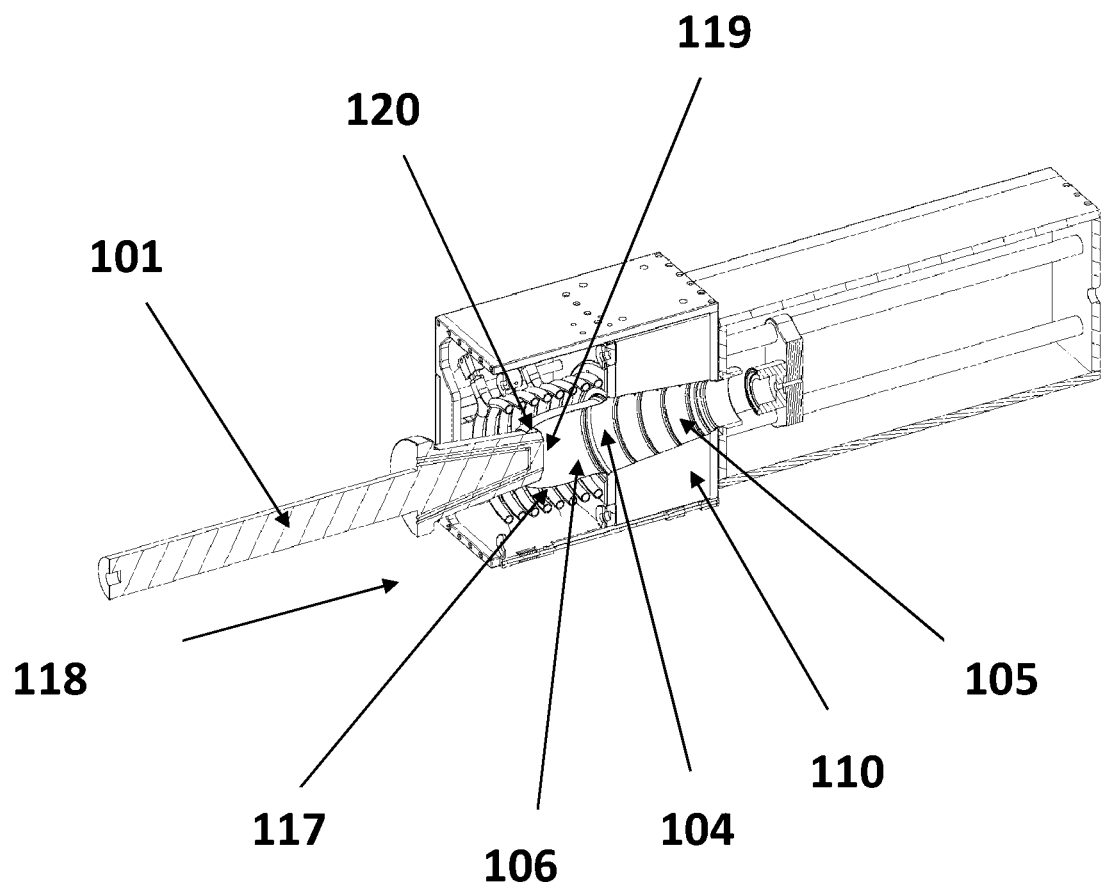
FIG. 19 shows a three-dimensional cross-section view of the inversion work station of FIGS. 17 and 18 with a partially inverted article to be formed according to the same third preferred embodiment of the present invention.

Referring to FIG. 19, the inversion work station of FIGS. 17 and 18 with a partially inverted article to be formed is depicted in three-dimensional view according to the same third preferred embodiment of the present invention.

According to the same third preferred embodiment of the present invention, an article to be formed 104 is depicted with at least some of the side wall(s) of a second smaller container 106 stretchingly and elastically expanded freely outwards 117 and ready for inversion as a result of at least one profiled inversion piston shaped as a male mould member 101 being displaced in the longitudinal direction 118 of a second single-container shaped mould cavity 110, thereby;

Engaging the at least partial bottom wall 119 of the second smaller container 106 with at least one profiled inversion piston shaped as a male mould member 101;

Displacing the at least one profiled inversion piston shaped as a male mould member 101 in the longitudinal direction 118 of a second single-container shaped mould cavity 110 such as to displace the at least partial bottom wall 119 of the second smaller container 106 towards and into a first container 105, Wherein at least one side wall of an article to be formed 104 is inverted progressively 120 with progression of the displacement of the at least partial bottom wall 119 and simultaneously the progressive inverted inner surface configuration of an article to be formed progressively and conformally engages 120 with the outer surface configuration of the profiled inversion piston shaped as a male mould member 101.

When a second smaller container 106 is free to stretchingly and elastically expand outwards prior to and during progressive inversion 120 due to the application of heat-conditioning and wall stability control in the form of interior and/or exterior pressure (not depicted), and inversion is effected by at least one profiled inversion piston shaped as a male mould member with an outer surface configuration that defines the inner surface configuration of an article being formed 101, at all times inverting wall(s) 120 of a second smaller container 106 are constrained to move only as dictated by the wall stability control(s) and profiled inverting piston(s) shaped as a male mould member 101 and thereby they never exceed the materials elastic limit. Thus, damage-free wall inversion can be achieved.

Figure 20:
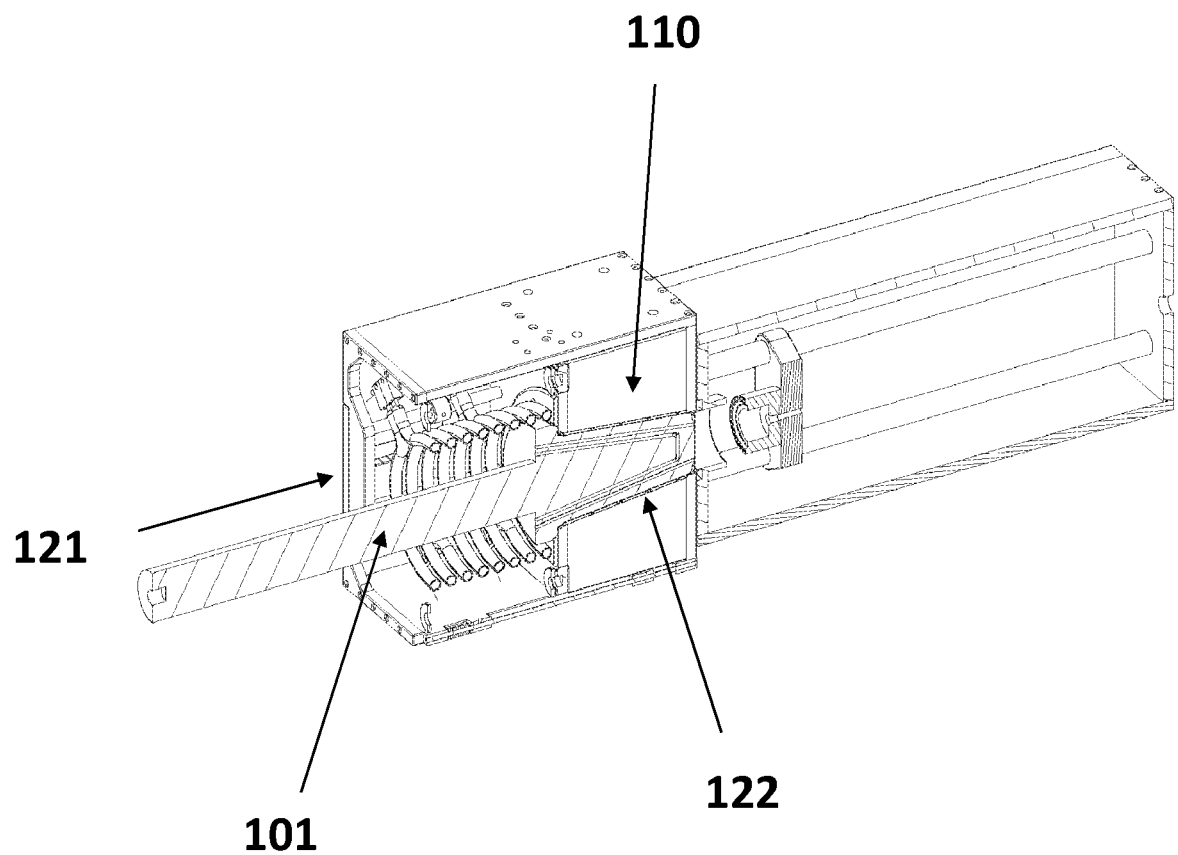
FIG. 20 shows a three-dimensional cross-section view of the inversion work station of FIGS. 17 through 19 with a fully inverted article in the form of an integral double-walled container according to the same third preferred embodiment of the present invention.

Referring to FIG. 20, the inversion work station of FIGS. 17 through 19 with a fully inverted article is depicted in three-dimensional view according to the same third preferred embodiment of the present invention.

According to the same third preferred embodiment of the present invention, the at least one profiled inversion piston shaped as a male mould member 101 has been fully displaced in the longitudinal direction 121 of the second single-container shaped mould cavity 110 and thereby a fully inverted article 122 has been formed (as depicted, in the form of an integral dual-container with the structure of a first container and integrally connected second container, with the first container and second container extending in the same direction as each other and formed as a single piece).

Figure 21:
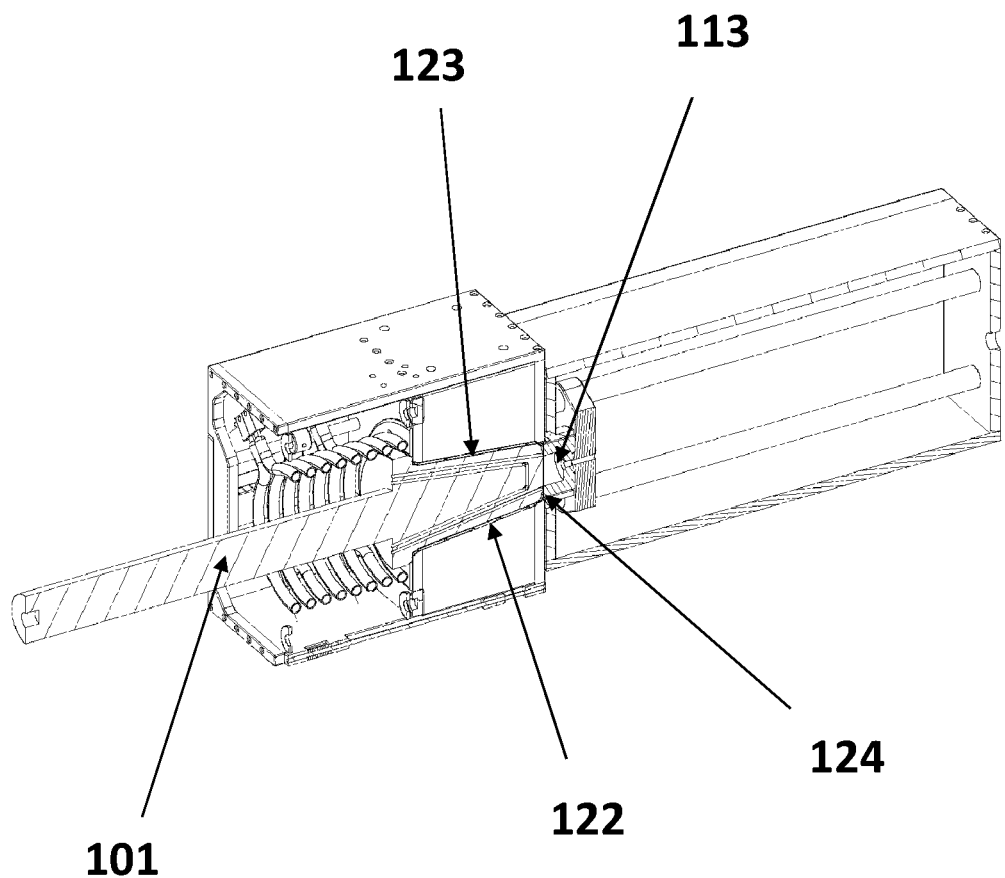
FIG. 21 shows a three-dimensional cross-section view of the inversion work station and fully inverted article in the form of an integral double-walled container of FIG. 20 with an inverted second container stability device engaged according to the same third preferred embodiment of the present invention.

Referring to FIG. 21, the inversion work station and fully inverted article of FIG. 20 with an engaged inverted second container stability device is depicted in three-dimensional view according to the same third preferred embodiment of the present invention.

According to the same third preferred embodiment of the present invention, once an article has been fully inverted 122, a profiled inversion piston shaped as a male mould member 101 may at least substantially conformally engage with the as-formed article 123 and thereby may require one or more means of retraction assistance when retracting the profiled inversion piston shaped as a male mould member 101 from the interior of the fully inverted article 122.

During the retraction process as means of assisting the outer surface configuration of a profiled inversion piston shaped as a male mould member 101 in releasing its at least substantial conformal engagement with the inner surface configuration of an article now formed 122, it is important to not affect the shape, form or stability of the now at least substantially inverted second smaller container. To this end, at least one inverted second smaller container stability device 113 may be engagingly connected 124 with an article now formed 122 (as depicted, in the form of a mechanical ejection backstop 113).

When means of retraction assistance is applied, the inverted second smaller container stability device 113 may counteract the potential of any part of an article now formed 122 from moving in any direction adverse to overall stability.

Figure 22:
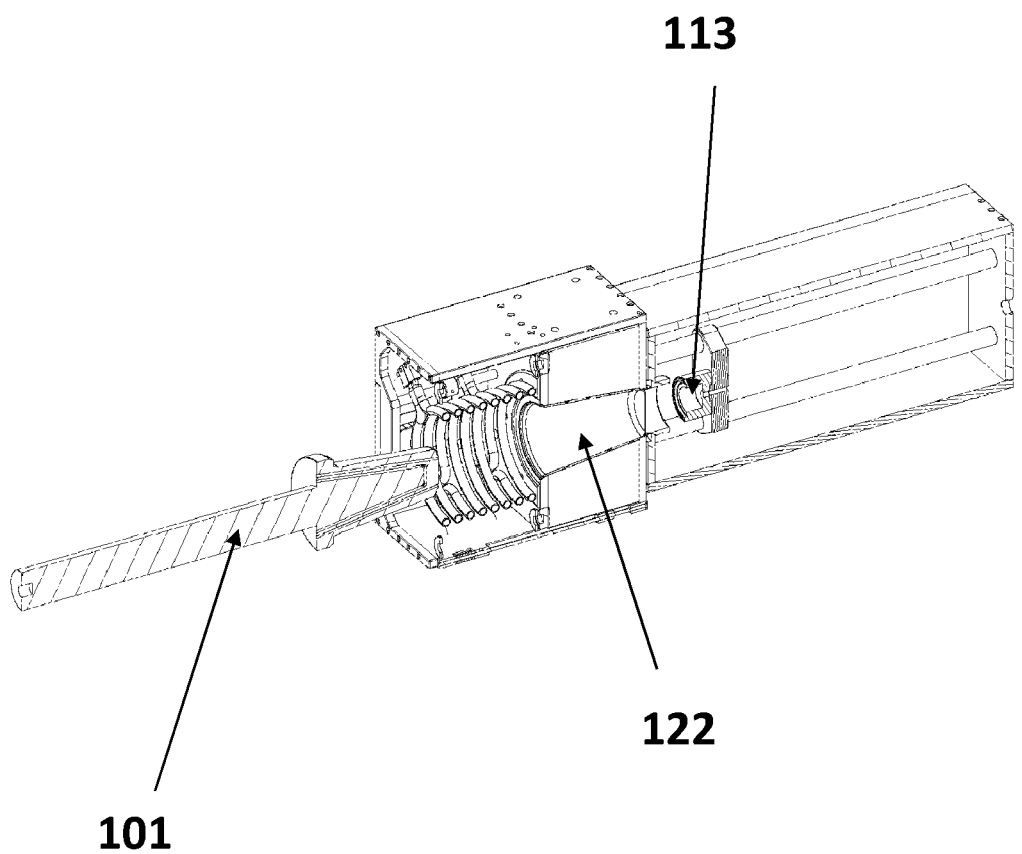
FIG. 22 shows a three-dimensional cross-section view of the inversion work station of FIGS. 17 through 21 with the fully inverted article in the form of an integral double-walled container of FIG. 20 ready for removal from the inversion work station according to the same third preferred embodiment of the present invention.

Referring to FIG. 22, the inversion work station of FIGS. 17 through 21 with the now fully inverted article of FIG. 20 ready for removal is depicted in three-dimensional view according to the same third preferred embodiment of the present invention.

According to the same third preferred embodiment of the present invention, a fully inverted article 122 (as depicted, in the form of an integral dual-container with the structure of a first container and integrally connected second container, with the first container and second container extending in the same direction as each other and formed as a single piece) may be ready for removal once a profiled inversion piston shaped as a male mould member 101 has at least substantially retracted back to its start position and any inverted second smaller container stability devices 113 have at least substantially retracted back to their start positions.

Figure 23:
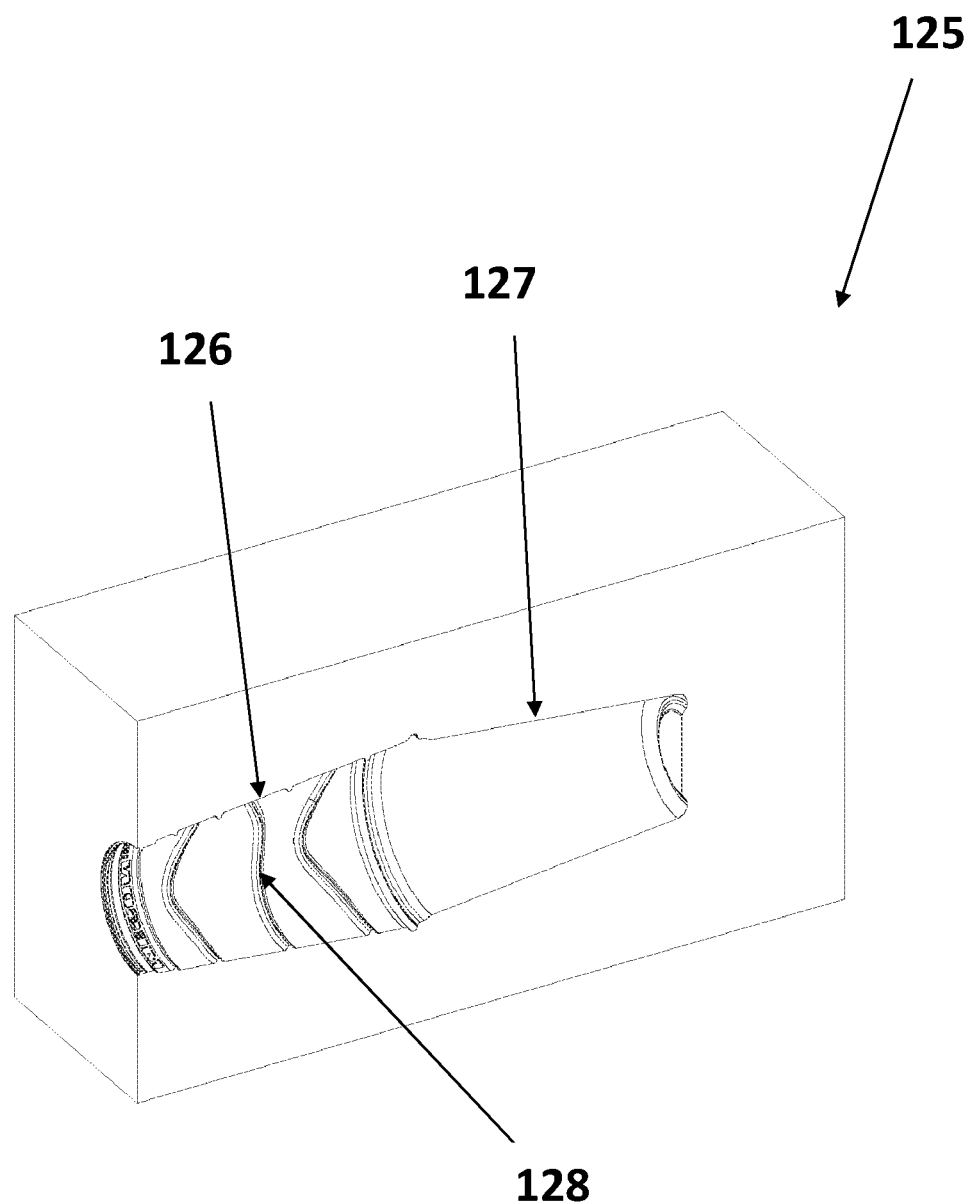
FIG. 23 shows a three-dimensional cross-section view of a first container shaped mould with dual-container configuration which includes in a first container cavity wall recess user interactive wall features in the form of inwardly extending curved walls according to the same third preferred embodiment of the present invention.

Referring to FIG. 23, a first container shaped mould with dual-container configuration which includes in a first container cavity wall recess user interactive features in the form of inwardly extending curved walls is depicted in three-dimensional view according to the same third preferred embodiment of the present invention.

According to the same third preferred embodiment of the present invention, a first container shaped mould with dual-container configuration 125 which includes a first container cavity wall recess 126 and a second smaller container cavity recess 127 may have user interactive features in the form of inwardly extending curved walls 128 in the first container cavity wall recess 126.

As by example only, the resulting air gap between the first container and inverted second smaller container of an as-formed article (not depicted) may be used in conjunction with inversely matching inwardly extending curved walls in the first container walls of an as-formed article as integral parts of user interactive features, including but by no means limited to:

As part of a drive-means to derive upwards, downwards, forwards and backwards motion for any additional interactive component or components inserted into or fluid and/or air suspended within the air gap (not depicted), such drive-means only as a result of user movement of the finished integral double-walled container, As part of a drive-means to derive upwards, downwards, forwards and backwards motion for any additional interactive component or components inserted into the air gap (not depicted), such drive-means forming part of interactive component movement as a result of direct user interaction, such direct user interaction including direct user contact with the additional interactive component or components inserted into the air gap.

Figure 24:
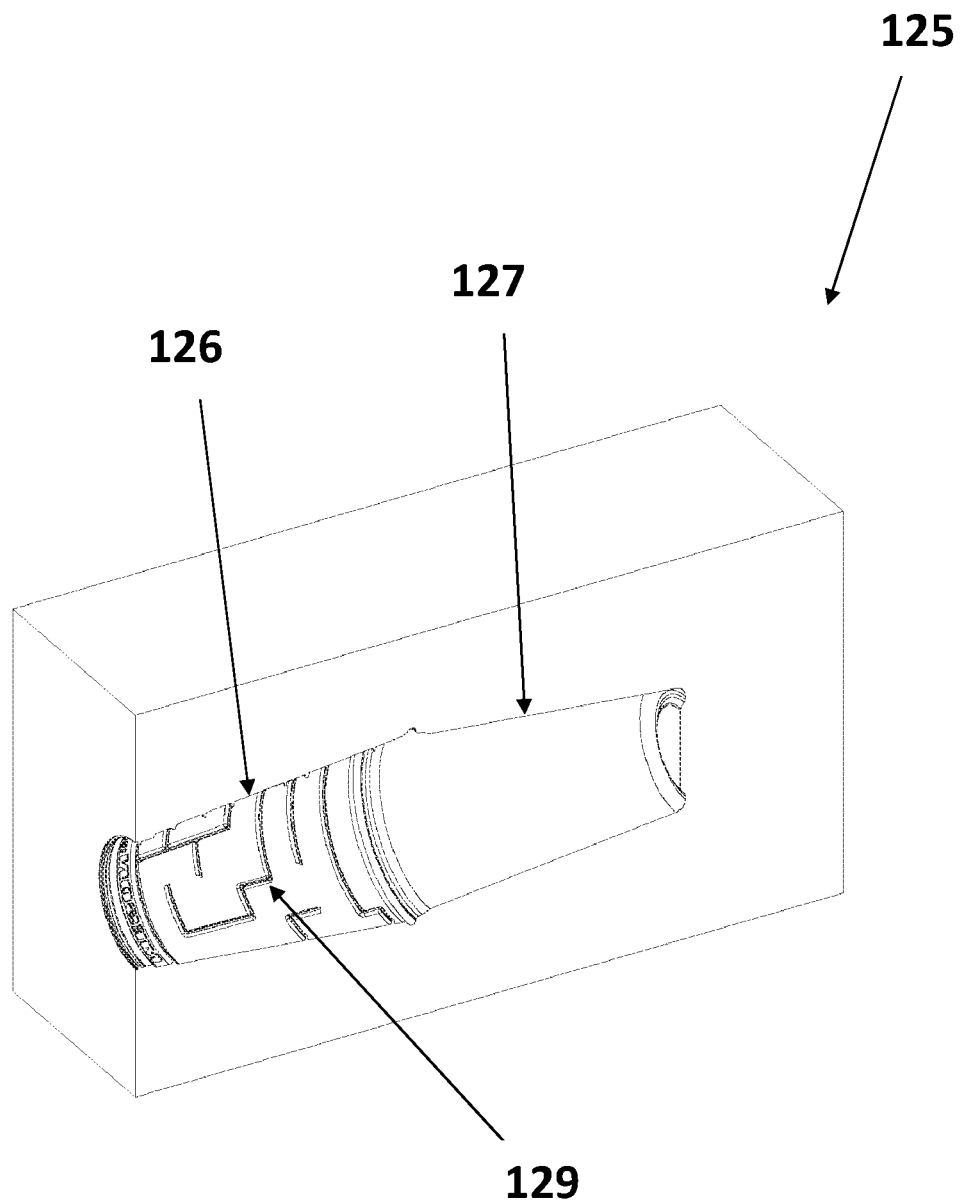
FIG. 24 shows a three-dimensional cross-section view of the same first container shaped mould with dual-container configuration of FIG. 23 which includes in a first container cavity wall recess user interactive wall features in the form of inwardly extending walls with substantially right angle wall direction changes, interconnecting walls and abutting walls according to the same third preferred embodiment of the present invention.

Referring to FIG. 24, the same first container shaped mould with dual-container configuration of FIG. 23 which includes in a first container cavity wall recess user interactive features in the form of inwardly extending walls with substantially right angle wall direction changes, interconnecting walls and abutting walls is depicted in three-dimensional view according to the same third preferred embodiment of the present invention.

According to the same third preferred embodiment of the present invention, a first container shaped mould with dual-container configuration 125 which includes a first container cavity wall recess 126 and a second smaller container cavity recess 127 may have user interactive features in the form of inwardly extending walls with substantially right angle wall direction changes, interconnecting walls and abutting walls 129 in the first container cavity wall recess 126.

As by example only, the resulting air gap between the first container and inverted second smaller container of an as-formed article (not depicted) may be used in conjunction with inversely matching inwardly extending walls formed by means of the inwardly extending curved walls 129 in a first container cavity wall recess 126, such inversely matching inwardly extending walls in the as-formed article having any combination of substantially right angle wall direction changes, interconnecting walls and abutting walls, and all forming an integral part of user interactive features, including but by no means limited to:

The creation of an interactive maze by the addition of one or more ball-shaped objects, and/or any other alternate shape of object or objects capable of motion within the air gap space (not depicted). Any form of fluid may also be added into the air gap if required.

As will be apparent to those versed in the art, any number of shapes and forms, or combinations of shapes and forms of inwardly extending wall features can be incorporated into the first container cavity wall of a first container shaped mould with dual-container configuration in order to create user interactive features in a final as-formed article in the form of a double-walled container with the structure of two integrally connected and adjacent containers extending in the same direction with an air gap between them and formed as a single body.

Where reference has been made to a method and apparatus wherein the second container is smaller than the first container, equally a method and apparatus may have a first container that is smaller than the second container.

Where in the foregoing description reference has been made to integers or components having known equivalents, then such equivalents are herein incorporated as if individually set forth.

Although this invention has been described by way of example and with reference to possible embodiments thereof, it is to be appreciated that improvements and/or modifications may be made thereto without departing from the scope or spirit of the invention. Any one or more elements that comprise any embodiment may equally be combined in any order into further embodiments readily apparent to those versed in the art.

What is claimed is:

1. A double-walled container, comprising
   (a) a pair of integral coaxial containers formed as a single body from a thermoplastic resin tubular blank, said containers being spaced to define an enclosed gap therebetween;
   (b) a wall of at least one of said containers containing at least one user interactive feature;
   (c) an air gap that houses at least one user interactive feature;
   (d) a wall of at least one of said containers containing at least one geometric component in conjunction with said air gap housed user interactive feature that together form a user interactive maze; and
   (e) a wall of at least one of said containers containing at least one further geometric component that in conjunction with said air gap housed user interactive feature is operable to drive said air gap interactive feature upwards, downwards, forwards or backwards within said air gap.

\* \* \* \* \*